(12) United States Patent
Ihara

(10) Patent No.: US 7,388,682 B1
(45) Date of Patent: Jun. 17, 2008

(54) IMAGE PROCESSING METHOD AND APPARATUS, PRINTING METHOD AND APPARATUS, IMAGE PRINTING SYSTEM AND METHOD AND RECORDING MEDIUM

(75) Inventor: Yushi Ihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 09/640,805

(22) Filed: Aug. 17, 2000

(30) Foreign Application Priority Data

Aug. 19, 1999 (JP) ................................. 11-233253
Sep. 14, 1999 (JP) ................................. 11-261276

(51) Int. Cl.
*H04N 1/40* (2006.01)
(52) U.S. Cl. ...................................... 358/1.15; 358/468
(58) Field of Classification Search ....... 358/1.14–1.16, 358/1.9, 2.1, 468
See application file for complete search history.

(56) References Cited

U.S. PATENT DOCUMENTS 6,099,181 A * 8/2000 Kitabatake .................. 400/710
6,603,737 B1 * 8/2003 Fukunaga et al. ........... 370/229

* cited by examiner

*Primary Examiner*—Thomas D. Lee
*Assistant Examiner*—Stephen Brinich
(74) *Attorney, Agent, or Firm*—Frommer Lawrence & Haug LLP; William S. Frommer; Thomas E. Presson

(57) ABSTRACT

An image printing system which enables printing after setting for printing in detail, even in case of an equipment connected to an interface pursuant to the IEEE 1394 standard. The image printing system includes an MPEG processor 16 for processing image signals inputted from outside to generate image data, a CPU 23 for generating the printing control information containing at least one of the printing sheet type information, printing sheet size information, printing color information, printing quality information, printing position information and the printing layout information, and a data conversion unit 13 for managing control so that the image data and the printing control information will be included in a packet pursuant to the IEEE 1394 standard and the resulting packet is outputting to a printing device 5 and so that the image data contained in the output packet will be printed in accordance with the printing control information.

6 Claims, 48 Drawing Sheets

| | pixel_x | pixel_y | interlaced/progressive | pixel format | screen aspect ratio | pixel aspect ratio | based standard | image size |
|---|---|---|---|---|---|---|---|---|
| 1080_422_16x9 | 1920 | 1080 | interlaced/progressive | YCbCr 4:2:2 | 16:9 | 1:1 | ITU-R BT.709-2 | 3.96MB |
| 1080_420_16x9 | 1920 | 1080 | interlaced/progressive | YCbCr 4:2:0 | 16:9 | 1:1 | ITU-R BT.709-2 | 2.97MB |
| 720_422_16x9 | 1280 | 720 | progressive | YCbCr 4:2:2 | 16:9 | 1:1 | ANSI/SMPTE 296M-1997 | 1.76MB |
| 720_420_16x9 | 1280 | 720 | progressive | YCbCr 4:2:0 | 16:9 | 1:1 | ANSI/SMPTE 296M-1997 | 1.32MB |
| 576_422_4x3 | 720 | 576 | interlaced/progressive | YCbCr 4:2:2 | 4:3 | 1.07:1 | ITU-R BT.1203 | 810KB |
| 576_420_4x3 | 720 | 576 | interlaced/progressive | YCbCr 4:2:0 | 4:3 | 1.07:1 | ITU-R BT.1203 | 608KB |
| 480_422_16x9 | 720 | 480 | interlaced/progressive | YCbCr 4:2:2 | 16:9 | 1.19:1 | ITU-R BT.709-2 | 675KB |
| 480_420_16x9 | 720 | 480 | interlaced/progressive | YCbCr 4:2:0 | 16:9 | 1.19:1 | ITU-R BT.709-2 | 506KB |
| 480_422_4x3 | 720 | 480 | interlaced/progressive | YCbCr 4:2:2 | 4:3 | 0.89:1 | ITU-R BT.601-4 | 675KB |
| 480_420_4x3 | 720 | 480 | interlaced/progressive | YCbCr 4:2:0 | 4:3 | 0.89:1 | ITU-R BT.601-4 | 506KB |

FIG.6

| | msb | | | | | | lsb |
|---|---|---|---|---|---|---|---|
| opcode | colspan="7" | CAPTURE(42₁₆) |
| operand[0] | colspan="7" | subfunction |
| operand[1] | colspan="4" | source_subunit_type | colspan="3" | source_subunit_ID |
| operand[2] | colspan="7" | source_plug |
| operand[3] | colspan="7" | status |
| operand[4] | colspan="7" | dest_plug |
| operand[5] | colspan="7" rowspan="3" | print_job_ID |
| ⋮ | | | | | | | |
| operand[16] | | | | | | | |
| operand[17] | colspan="7" rowspan="4" | data_size |
| operand[18] | | | | | | | |
| operand[19] | | | | | | | |
| operand[20] | | | | | | | |
| operand[21] | colspan="7" rowspan="2" | image_size_x |
| operand[22] | | | | | | | |
| operand[23] | colspan="7" rowspan="2" | image_size_y |
| operand[24] | | | | | | | |
| operand[25] | colspan="7" rowspan="2" | image_format_specifier |
| operand[26] | | | | | | | |
| operand[27] | colspan="7" rowspan="3" | reserved |
| operand[28] | | | | | | | |
| operand[29] | | | | | | | |
| operand[30] | colspan="7" | next_pic |
| operand[31] | colspan="7" rowspan="2" | next_page |
| operand[32] | | | | | | | |

FIG.7

| value | Type | Meaning |
|---|---|---|
| $20_{16}$ | 1080i_422chunky_16x9 | |
| $21_{16}$ | 1080p_422chunky_16x9 | |
| $22_{16}$ | 720p_422chunky_16x9 | |
| $23_{16}$ | 480I_422chunky_16x9 | |
| $24_{16}$ | 480p_422chunky_16x9 | |
| $25_{16}$ | 480I_422chunky_4x3 | |
| $26_{16}$ | 480p_422chunky_4x3 | |
| $28_{16}$ | 1080i_422liner_16x9 | |
| $29_{16}$ | 1080p_422liner_16x9 | |
| $2A_{16}$ | 720p_422liner_16x9 | |
| $2B_{16}$ | 480I_422liner_16x9 | |
| $2C_{16}$ | 480p_422liner_16x9 | |
| $2D_{16}$ | 480I_422liner_4x3 | |
| $2E_{16}$ | 480p_422liner_4x3 | |
| $30_{16}$ | 1080i_420planer_16x9 | |
| $31_{16}$ | 1080p_420planer_16x9 | |
| $32_{16}$ | 720p_420planer_16x9 | |
| $33_{16}$ | 480I_420planer_16x9 | |
| $34_{16}$ | 480p_420planer_16x9 | |
| $35_{16}$ | 480I_420planer_4x3 | |
| $36_{16}$ | 480p_420planer_4x3 | |
| $38_{16}$ | 1080i_420liner_16x9 | |
| $39_{16}$ | 1080p_420liner_16x9 | |
| $3A_{16}$ | 720p_420liner_16x9 | |
| $3B_{16}$ | 480I_420liner_16x9 | |
| $3C_{16}$ | 480p_420liner_16x9 | |
| $3D_{16}$ | 480I_420liner_4x3 | |
| $3E_{16}$ | 480p_420liner_4x3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.8

| Valuue(MSB) | Valuue(LSB) | Type | Meaning |
|---|---|---|---|
| 00₁₆ | | | |
| | 00₁₆ | sRGB raw | sRGB raw |
| | 01₁₆ | sRGB raw, quadlet | |
| 01₁₆ | | | YCC raw |
| | 0X₁₆ | YCC4:2:2 raw/chunky | |
| | 1X₁₆ | YCC4:2:2 raw/liner | |
| | 8X₁₆ | YCC4:2:0 raw/chunky | |
| | 9X₁₆ | YCC4:2:0 raw/liner | |
| | X0₁₆ | Pixel ratio 1.00X1.00/ITU-R BT.709-2/interlace | |
| | X1₁₆ | Pixel ratio 1.19X1.00/ITU-R BT.709-2/interlace | |
| | X2₁₆ | Pixel ratio 0.89X1.00/ITU-R BT.709-2/interlace | |
| | X3₁₆ | Pixel ratio 0.89X1.00/ITU-R BT.601-4/interlace | |
| | X4₁₆ | Pixel ratio 1.07X1.00/ITU-R BT.1203/interlace | |
| | X8₁₆ | Pixel ratio 1.00X1.00/ITU-R BT.709-2/progressive | |
| | X9₁₆ | Pixel ratio 1.19X1.00/ITU-R BT.709-2/progressive | |
| | XA₁₆ | Pixel ratio 0.89X1.00/ITU-R BT.709-2/progressive | |
| | XB₁₆ | Pixel ratio 0.89X1.00/ITU-R BT.601-4/progressive | |
| | XC₁₆ | Pixel ratio 1.07X1.00/ITU-R BT.1203/progressive | |
| 10₁₆ | | | DCF Object |
| | 00₁₆ | Exif2.1 | |
| | 01₁₆ | JFIF | |
| | 02₁₆ | TIFF | |
| | 0F₁₆ | JPEG | |
| 80₁₆~BF₁₆ | 00₁₆~FF₁₆ | Vendor Dependent format | |
| FE₁₆ | | Unit Plug defined | Special meaning |
| | 00₁₆ | don't care | |
| | 01₁₆ | | |

FIG.9

| $Y_1(L_1)$ | $Y_2(L_1)$ | $Cb_1(L_1)$ | $Cr_1(L_1)$ |
|---|---|---|---|
| $Y_3(L_1)$ | $Y_4(L_1)$ | $Cb_3(L_1)$ | $Cr_3(L_1)$ |
| ⋮ | | | |
| $Y_{N-1}(L_1)$ | $Y_N(L_1)$ | $Cb_{N-1}(L_1)$ | $Cr_{N-1}(L_1)$ |
| $Y_1(L_2)$ | $Y_2(L_2)$ | $Cb_1(L_2)$ | $Cr_1(L_2)$ |
| ⋮ | | | |
| $Y_{N-1}(L_M)$ | $Y_N(L_M)$ | $Cb_{N-1}(L_M)$ | $Cr_{N-1}(L_M)$ |

FIG.10

| $Y_1(L_1)$ | $Y_2(L_1)$ | $Y_1(L_2)$ | $Y_2(L_2)$ |
|---|---|---|---|
| $Cb_1(L_1)$ | $Cr_1(L_1)$ | $Y_3(L_1)$ | $Y_4(L_1)$ |
| $Y_3(L_2)$ | $Y_4(L_2)$ | $Cb_3(L_1)$ | $Cr_3(L_1)$ |
| ⋮ | | | |
| $Y_{N-3}(L_{M-1})$ | $Y_{N-2}(L_{M-1})$ | $Y_{N-3}(L_M)$ | $Y_{N-2}(L_M)$ |
| $Cb_{N-3}(L_{M-1})$ | $Cr_{N-3}(L_{M-1})$ | $Y_{N-1}(L_{M-1})$ | $Y_N(L_{M-1})$ |
| $Y_{N-1}(L_M)$ | $Y_N(L_M)$ | $Cb_{N-1}(L_{M-1})$ | $Cr_{N-1}(L_{M-1})$ |

FIG.11

| $Y_1(L_1)$ | $Y_2(L_1)$ | $Y_3(L_1)$ | $Y_4(L_1)$ |
|---|---|---|---|
| ⋮ | | | |
| $Y_{N-3}(L_1)$ | $Y_{N-2}(L_1)$ | $Y_{N-1}(L_1)$ | $Y_N(L_1)$ |
| $Cb_1(L_1)$ | $Cr_1(L_1)$ | $Cb_3(L_2)$ | $Cr_3(L_1)$ |
| ⋮ | | | |
| $Cb_{N-3}(L_1)$ | $Cr_{N-3}(L_1)$ | $Cb_{N-1}(L_1)$ | $Cr_{N-1}(L_1)$ |
| $Y_1(L_2)$ | $Y_2(L_2)$ | $Y_3(L_1)$ | $Y_4(L_1)$ |
| ⋮ | | | |
| $Cb_{N-3}(L_M)$ | $Cr_{N-3}(L_M)$ | $Cb_{N-1}(L_M)$ | $Cr_{N-1}(L_M)$ |

FIG.12

| $Y_1(L_1)$ | $Y_2(L_1)$ | $Y_3(L_1)$ | $Y_4(L_1)$ |
|---|---|---|---|
| ⋮ | ⋮ | ⋮ | ⋮ |
| $Y_{N-3}(L_1)$ | $Y_{N-2}(L_1)$ | $Y_{N-1}(L_1)$ | $Y_N(L_1)$ |
| $Y_1(L_2)$ | $Y_2(L_2)$ | $Y_3(L_2)$ | $Y_4(L_2)$ |
| ⋮ | ⋮ | ⋮ | ⋮ |
| $Y_{N-3}(L_2)$ | $Y_{N-2}(L_2)$ | $Y_{N-1}(L_2)$ | $Y_N(L_2)$ |
| $Cb_1(L_1)$ | $Cr_1(L_1)$ | $Cb_3(L_1)$ | $Cr_3(L_1)$ |
| ⋮ | ⋮ | ⋮ | ⋮ |
| $Cb_{N-3}(L_1)$ | $Cr_{N-3}(L_1)$ | $Cb_{N-1}(L_1)$ | $Cr_{N-1}(L_1)$ |
| $Y_1(L_3)$ | $Y_2(L_3)$ | $Y_3(L_3)$ | $Y_4(L_3)$ |
| ⋮ | ⋮ | ⋮ | ⋮ |
| $Cb_{N-3}(L_{M-1})$ | $Cr_{N-3}(L_{M-1})$ | $Cb_{N-1}(L_{M-1})$ | $Cr_{N-1}(L_{M-1})$ |

FIG.13

| Address Offset | 1st byte | 2nd byte | 3rd byte | 4th byte |
|---|---|---|---|---|
| 00 00 00 00 $_{16}$ | Y1(L1) | Y2(L1) | Cb1(L1) | Cr1(L1) |
| 00 00 00 04 $_{16}$ | Y3(L1) | Y4(L1) | Cb3(L1) | Cr3(L1) |
| ... | ... | ... | ... | ... |
| 00 00 05 9C $_{16}$ | Y719(L1) | Y720(L1) | Cb719(L1) | Cr719(L1) |
| 00 00 05 A0 $_{16}$ | Y1(L2) | Y2(L2) | Cb1(L2) | Cr1(L2) |
| ... | ... | ... | ... | ... |
| 00 0A 8B FC $_{16}$ | Y719(L480) | Y720(L480) | Cb719(L480) | Cr719(L480) |

FIG.14

| Address Offset | 1st byte | 2nd byte | 3rd byte | 4th byte |
|---|---|---|---|---|
| 00 00 00 00₁₆ | Y1(L1) | Y2(L1) | Y1(L2) | Y2(L2) |
| 00 00 00 04₁₆ | Cr1(L1) | Cr1(L1) | Y1(L1) | Y4(L1) |
| 00 00 00 08₁₆ | Y3(L2) | Y4(L2) | Cb3(L1) | Cr3(L1) |
| ... | | | | |
| 00 07 E8 F8₁₆ | Cb717(L479) | Cr717(L479) | Y719(L479) | Y720(L479) |
| 00 07 E8 FC₁₆ | Y719(L480) | Y720(L480) | Cb719(L479) | Cr719(L479) |

FIG.15

| Address Offset | 1st byte | 2nd byte | 3rd byte | 4th byte |
|---|---|---|---|---|
| 00 00 00 00₁₆ | Y1(L1) | Y2(L1) | Y3(L1) | Y4(L1) |
| ... | | | | |
| 00 00 02 CF₁₆ | Y717(L1) | Y718(L1) | Y719(L1) | Y720(L1) |
| 00 00 02 D0₁₆ | Cb1(L1) | Cr1(L1) | Cb3(L1) | Cr3(L1) |
| ... | | | | |
| 00 00 05 9F₁₆ | Cb717(L1) | Cr717(L1) | Cb719(L1) | Cr719(L1) |
| 00 00 05 A0₁₆ | Y1(L2) | Y2(L2) | Y3(L2) | Y4(L2) |
| ... | | | | |
| 00 0A 8B FC₁₆ | Cb717(L480) | Cr717(L480) | Cb719(L480) | Cr719(L480) |

FIG.16

| Address Offset | 1st byte | 2nd byte | 3rd byte | 4th byte |
|---|---|---|---|---|
| 00 00 00 00₁₆ | Y1(L1) | Y2(L1) | Y3(L1) | Y4(L1) |
| ... | | | | |
| 00 00 02 CF₁₆ | Y717(L1) | Y718(L1) | Y719(L1) | Y720(L1) |
| 00 00 02 D0₁₆ | Y1(L2) | Y2(L2) | Y3(L2) | Y4(L2) |
| ... | | | | |
| 00 00 05 9F₁₆ | Y717(L2) | Y718(L2) | Y719(L2) | Y720(L2) |
| 00 00 05 A0₁₆ | Cb1(L1) | Cr1(L1) | Cb3(L1) | Cr3(L1) |
| ... | | | | |
| 00 00 08 6F₁₆ | Cb717(L1) | Cr717(L1) | Cb719(L1) | Cr719(L1) |
| 00 00 08 70₁₆ | Y1(L3) | Y2(L3) | Y3(L3) | Y4(L3) |
| ... | | | | |
| 00 07 E8 FC₁₆ | Cb717(L479) | Cr717(L479) | Cb719(L479) | Cr719(L479) |

FIG.17

| value | Symbol | Meaning |
|---|---|---|
| $01_{16}$ | get | Get the current operation modes |
| $02_{16}$ | set | Set the specified operation modes |
| $03_{16}$ | query | Get the supported operation modes |
| Other values | — | Reserved |

FIG.19

| Address Offset | Contents |
|---|---|
| $00_{16}$ | media_type |
| $01_{16}$ | Media_size |
| $02_{16}$ | |
| $03_{16}$ | |
| $04_{16}$ | reserved |
| $05_{16}$ | Print_quality |
| $06_{16}$ | Mono_color |
| $07_{16}$ | offset |
| $08_{16}$ | |
| $09_{16}$ | |
| $0A_{16}$ | |
| $0B_{16}$ | Layout_type |
| $0C_{16}$ | |
| $0D_{16}$ | |
| $0E_{16}$ | |

FIG.20

| address offset | msb | | | | | | lsb |
|---|---|---|---|---|---|---|---|
| $00_{16}$ | device-dependent | Plain_paper | Bond_paper | Special_paper | Photo_paper | Transparency_film | Reserved |

FIG.21

| Symbol | Meaning |
|---|---|
| device-dependent | The image output will be sized as device dependent. (Mandatory) |
| Plain_paper | PLAIN PAPER |
| Bond_paper | SEAL |
| Special_paper | SPECIAL PAPER |
| Photo_paper | PHOTO PAPER |
| Transparency-film | OHP FILM |

FIG.22

| address offset | msb | | | | | | lsb |
|---|---|---|---|---|---|---|---|
| 00₁₆ | device-dependent | A5 | A4 | B5 | Executive | Letter | Legal | Reserved |
| 01₁₆ | Hagaki | Oufuku-Hagaki | A6 | Index_4x6 | Index_5x8 | A3 | B4 | Legal_11x 17 |
| 02₁₆ | Commercl all0_portr alt | Commercl all0_lands cape | DL | C6 | A2 | Custom | reserved | |

FIG.23

| Symbol | Meaning |
|---|---|
| Device_dependent | The image output will be sized as device dependent. (Mandatory) |
| A5 | ISO and JIS A5 |
| A4 | ISO and JIS A4 |
| B5 | JIS B5 |
| Executive | US Executive |
| Letter | US Letter |
| Legal | US Legal |
| Hagaki | POST CARD |
| Oufuku_hagaki | RETURN POST CARD |
| A6 | ISO and JIS A6 Card |
| Index_4X6 | US Index Card 4"X6" |
| Index_5X8 | US Index Card 5"X8" |
| A3 | ISO A3 |
| B4 | B4 |
| Legal_11X17 | Legal 11X17 |
| Commercial10_portrait | US Comercial#10(portrait) |
| Commercial10_landscape | US Comercial#10(landscape) |
| DL | International DL |
| C6 | International C6 |
| A2 | US A2 |
| Custom | Custom paper |

FIG.24

| address Offset | msb | | | | | | | lsb |
|---|---|---|---|---|---|---|---|---|
| 00₁₆ | device-dependent | other | letter | legal | | | | |
| 01₁₆ | na_10x13_envelope | na_9x12_envelope | na_number_10_envelope | na_7x9_envelope | na_9x11_envelope | na_10x14_envelope | na_6x9_envelope | na_10x15_envelope |
| 02₁₆ | reserved | | | | | | | |
| 03₁₆ | iso_a0 | iso_a1 | iso_a2 | iso_a3 | iso_a4 | iso_a5 | iso_a6 | iso_a7 |
| 04₁₆ | iso_a8 | iso_a9 | iso_a10 | reserved | | | | |
| 05₁₆ | iso_b0 | iso_b1 | iso_b2 | iso_b3 | iso_b4 | iso_b5 | iso_b6 | iso_b7 |
| 06₁₆ | iso_b8 | iso_b9 | iso_b10 | reserved | | | | |
| 07₁₆ | iso_c0 | iso_c1 | iso_c2 | iso_c3 | iso_c4 | iso_c5 | iso_c6 | iso_c7 |
| 08₁₆ | iso_c8 | iso_designated | reserved | | | | | |
| 09₁₆ | jis_b0 | jis_b1 | jis_b2 | jis_b3 | jis_b4 | jis_b5 | jis_b6 | jis_b7 |
| 0A₁₆ | jis_b8 | jis_b9 | jis_b10 | reserved | | | | |
| 0B₁₆ | index_4x6 | index_5x8 | reserved | | japanese_hagaki | japanese_oufuku_hagaki | reserved | |

FIG.25

| Value | Symbol | Meaning | Width | Height |
|---|---|---|---|---|
| $00_{16}$ | device_dependent | The paper size will be used as device dependent | — | — |
| $01_{16}$ | other | other | | |
| $10_{16}$ | letter | North American letter size | 8.5 inch | 11 inch |
| $11_{16}$ | legal | North American letter size | 8.5 inch | 14 inch |
| $20_{16}$ | na_10X13_envelope | North American 10X13 envelope size | 10 inch | 13 inch |
| $21_{16}$ | na_9X12_envelope | North American 9X12 envelope | 9 inch | 12 inch |
| $22_{16}$ | na_number_10_envelope | North American number 10 business envelope | 4.125 inch | 9.5 inch |
| $23_{16}$ | na_7X9_envelope | North American 7X9 | 7 inch | 9 inch |
| $24_{16}$ | na_9X11_envelope | North American 9X11 | 9 inch | 11 inch |
| $25_{16}$ | na_10X14_envelope | North American 10X14 envelope | 10 inch | 14 inch |
| $26_{16}$ | na_6X9_envelope | North American 6X9 envelope | 6 inch | 9 inch |
| $27_{16}$ | na_10X15_envelope | North American 10X15 envelope | 10 inch | 15 inch |
| $30_{16}$ | a | engineering A | 8.5 inch | 11 inch |
| $31_{16}$ | b | engineering B | 11 inch | 17 inch |
| $32_{16}$ | c | engineering C | 17 inch | 22 inch |
| $33_{16}$ | d | engineering D | 22 inch | 34 inch |
| $34_{16}$ | e | engineering E | 34 inch | 44 inch |
| $40_{16}$ | iso a0 | ISO A0 | 841 mm | 1189 mm |
| $41_{16}$ | iso a1 | ISO A1 | 594 mm | 841 mm |
| $42_{16}$ | iso a2 | ISO A2 | 420 mm | 594 mm |
| $43_{16}$ | iso a3 | ISO A3 | 297 mm | 420 mm |
| $44_{16}$ | iso a4 | ISO A4 | 210 mm | 297 mm |
| $45_{16}$ | iso a5 | ISO A5 | 148 mm | 210 mm |
| $46_{16}$ | iso a6 | ISO A6 | 105 mm | 148 mm |
| $47_{16}$ | iso a7 | ISO A7 | 74 mm | 105 mm |
| $48_{16}$ | iso a8 | ISO A8 | 52 mm | 74 mm |
| $49_{16}$ | iso a9 | ISO A9 | 37 mm | 52 mm |
| $4A_{16}$ | iso a10 | ISO A10 | 26 mm | 37 mm |

FIG.26

| Value | Symbol | Meaning | Width | Height |
|---|---|---|---|---|
| $50_{16}$ | iso b0 | ISO B0 | 1000mm | 1414mm |
| $51_{16}$ | iso b1 | ISO B1 | 707mm | 1000mm |
| $52_{16}$ | iso b2 | ISO B2 | 500mm | 707mm |
| $53_{16}$ | iso b3 | ISO B3 | 353mm | 500mm |
| $54_{16}$ | iso b4 | ISO B4 | 250mm | 353mm |
| $55_{16}$ | iso b5 | ISO B5 | 176mm | 250mm |
| $56_{16}$ | iso b6 | ISO B6 | 125mm | 176mm |
| $57_{16}$ | iso b7 | ISO B7 | 88mm | 125mm |
| $58_{16}$ | iso b8 | ISO B8 | 62mm | 88mm |
| $59_{16}$ | iso b9 | ISO B9 | 44mm | 62mm |
| $5A_{16}$ | iso b10 | ISO B10 | 31mm | 44mm |
| $60_{16}$ | iso c0 | ISO C0 | 917mm | 1297mm |
| $61_{16}$ | iso c1 | ISO C1 | 648mm | 917mm |
| $62_{16}$ | iso c2 | ISO C2 | 458mm | 648mm |
| $63_{16}$ | iso c3 | ISO C3 | 324mm | 458mm |
| $64_{16}$ | iso c4 | ISO C4 | 229mm | 324mm |
| $65_{16}$ | iso c5 | ISO C5 | 162mm | 229mm |
| $66_{16}$ | iso c6 | ISO C6 | 114mm | 162mm |
| $67_{16}$ | iso c7 | ISO C7 | 81mm | 114mm |
| $68_{16}$ | iso c8 | ISO C8 | 57mm | 81mm |
| $69_{16}$ | iso designated | ISODesignatedLong | 110mm | 220mm |
| $70_{16}$ | iso b0 | ISO B0 | 1030mm | 1456mm |
| $71_{16}$ | iso b1 | ISO B1 | 728mm | 1030mm |
| $72_{16}$ | iso b2 | ISO B2 | 515mm | 728mm |
| $73_{16}$ | iso b3 | ISO B3 | 364mm | 515mm |
| $74_{16}$ | iso b4 | ISO B4 | 257mm | 364mm |
| $75_{16}$ | iso b5 | ISO B5 | 182mm | 257mm |
| $76_{16}$ | iso b6 | ISO B6 | 128mm | 182mm |
| $77_{16}$ | iso b7 | ISO B7 | 91mm | 128mm |
| $78_{16}$ | iso b8 | ISO B8 | 64mm | 91mm |
| $79_{16}$ | iso b9 | ISO B9 | 45mm | 64mm |
| $7A_{16}$ | iso b10 | ISO B10 | 32mm | 45mm |
| $80_{16}$ | index4X6 | NorthAmericanIndexCard4"X6" | 4 inch | 6 inch |
| $81_{16}$ | index5X8 | NorthAmericanIndexCard5"X8" | 5 inch | 8 inch |
| $90_{16}$ | japanese_hagaki | JapaneseHagakiPostcard | 100mm | 148mm |
| $91_{16}$ | japanese_oufuku_hagaki | JapaneseOufukuHagakiPostcard | 148mm | 200mm |

FIG.27

| Symbol | Meaning | |
|---|---|---|
| device_dependent | The image output will be sized as device dependent. (Mandatory) | |
| | economy | PRIORITY ON SPEED |
| | normal | NORMAL |
| | best | PRIORITY ON PICTURE QUALITY |

FIG.29

| Symbol | Meaning |
|---|---|
| device-dependent | The image output will be sized as device dependent. (Mandatory) |
| mono | BLACK/WHITE PRINTING |
| color | COLOR PRINTING |

FIG.31

| Symbol | Meaning |
|---|---|
| device_dependent | The image output will be sized as device dependent. |
| black_white | MONOCHROMATIC PRINTING |
| mono | MONOCHROMATIC (GRAY SCALE) PRINTING |
| color | COLOR PRINTING |

FIG.33

| address offset | msb | | | | | | | lsb |
|---|---|---|---|---|---|---|---|---|
| $00_{16}$ | | | | | | | | |
| $01_{16}$ | \multicolumn{8}{l|}{Offset_top} |
| $02_{16}$ | \multicolumn{8}{l|}{Offset_left} |
| $03_{16}$ | | | | | | | | |

FIG.34

| Symbol | Meaning |
|---|---|
| Offset_top<br>Offset_left | $X000_{16} \sim X999_{16}$ OFFSET POSITION PACKED IN BCD(00.0 $\sim$99.9mm, $X=0_{16}$: PLUS(TOWARDS PAPER INSIDE), $X=8_{16}$: MINUS (TOWARDS PAPER OUTSIDE) $FFFF_{16}$: device_dependent |

FIG.35

| Symbol | Meaning |
|---|---|
| Layout_type | $00000000_{16}$ ~ $0FFFFFF_{16}$ : LAYOUTTYPE<br>$FFFFFFF_{16}$ : device_dependent |

FIG.37

| Address Offset | Contents |
|---|---|
| $00_{16}$ | media_type |
| $01_{16}$ | media_size |
| $02_{16}$ | print_quality |
| $03_{16}$ | mono_color |
| $04_{16}$ | rendering_Intent |

FIG. 39

| operands | CONTROL command | ACCEPTED response | REJECTED response |
|---|---|---|---|
| subfunction | set | set | set |
| next_pic | $FF_{16}$ | 0x00 | 0x00 |
| next_page | $FFFF_{16}$ | next page | next page |
| print_job_ID. | ID_number | ID_number | ID_number |
| operation_mode _parameters | requested state | current state =requested state | current state + rejected field changes to $FF_{16}$ |
| operation_mode _optional_param eters | $00\ 00..._{16}$ | $00\ 00..._{16}$ | $00\ 00..._{16}$ |
| status | $FF_{16}$ | $00_{16}$(no error) | rejected state/reason |

FIG. 43

| operands | STATUS command | STABLE response | REJECTED response |
|---|---|---|---|
| subfunction | get | get | get |
| next_pic | $FF_{16}$ | next pic number | next pic number |
| next_page | $FFFF_{16}$ | next page number | next page number |
| print_job_ID. | ID_number | ID_number | ID_number |
| operation_mode _parameters | $FF\ FF..._{16}$ | current values | current values |
| operation_mode _optional_param eters | $00\ 00..._{16}$ | $00\ 00..._{16}$ | $00\ 00..._{16}$ |
| status | $FF_{16}$ | $00_{16}$(no error) | rejected state/reason |

FIG.44

| operands | CONTROL command | ACCEPTED response | REJECTED response |
|---|---|---|---|
| subfunction | set | set | set |
| next_pic | $FF_{16}$ | 0x00 | 0x00 |
| next_page | $FFFF_{16}$ | next page | next page |
| print_job_ID. | ID_number | ID_number | ID_number |
| operation_mode _parameters | requested state | current state =requested state | current state + rejected field changes to $FF_{16}$ |
| operation_mode _optional_param eters | 00 00..$_{16}$ | current state = all state is "vender dependent" | current state = all state is "vender dependent" |
| status | $FF_{16}$ | $00_{16}$(no error) | rejected state/reason |

FIG.45

| operands | STATUS command | STABLE response | REJECTED response |
|---|---|---|---|
| subfunction | get | get | get |
| next_pic | $FF_{16}$ | next pic number | next pic number |
| next_page | $FFFF_{16}$ | next page number | next page number |
| print_job_ID. | ID_number | ID_number | ID_number |
| operation_mode _parameters | FF FF..$_{16}$ | current values | current values |
| operation_mode _optional_param eters | 00 00..$_{16}$ | current values | current values |
| status | $FF_{16}$ | $00_{16}$(no error) | rejected reason |

FIG.46

| operands | CONTROL command | NOT IMPLEMENTED response |
|---|---|---|
| subfunction | set | set |
| next_pic | $FF_{16}$ | 0x00 |
| next_page | $FFFF_{16}$ | next page |
| print_job_ID. | ID_number | ID_number |
| operation_mode _parameters | requested state | current state |
| operation_mode _optional_param eters | requested state | $00\ 00..._{16}$ |
| status | $FF_{16}$ | reason |

FIG.47

| operands | STATUS command | NOT IMPLEMENTED response |
|---|---|---|
| subfunction | get | get |
| next_pic | $FF_{16}$ | next pic number |
| next_page | $FFFF_{16}$ | next page number |
| print_job_ID. | ID_number | ID_number |
| operation_mode _parameters | $FF\ FF.._{16}$ | current values |
| operation_mode _optional_param eters | $FF\ FF.._{16}$ | $00\ 00.._{16}$ |
| status | $FF_{16}$ | reason |

FIG.48

| operands | CONTROL command | ACCEPTED response | REJECTED response |
|---|---|---|---|
| subfunction | set | set | set |
| next_pic | $FF_{16}$ | 0x00 | 0x00 |
| next_page | $FFFF_{16}$ | next page | next page |
| print_job_ID. | ID_number | ID_number | ID_number |
| operation_mode _parameters | requested state | current state =requested state | current state + rejected field changes to $FF_{16}$ |
| operation_mode _optional_param eters | requested state | current state =requested state | current state + rejected field changes to $FF_{16}$ |
| status | $FF_{16}$ | $00_{16}$(no error) | rejected state/reason |

FIG.49

| operands | STATUS command | STABLE response | REJECTED response |
|---|---|---|---|
| subfunction | get | get | get |
| next_pic | FF₁₆ | next pic number | next pic number |
| next_page | FFFF₁₆ | next page number | next page number |
| print_job_ID. | ID_number | ID_number | ID_number |
| operation_mode _parameters | FF FF..₁₆ | current values | current values |
| operation_mode _optional_param eters | FF FF..₁₆ | current values | current values |
| status | FF₁₆ | 00₁₆(no error) | rejected reason |

FIG.50

IMAGE PROCESSING METHOD AND APPARATUS, PRINTING METHOD AND APPARATUS, IMAGE PRINTING SYSTEM AND METHOD AND RECORDING MEDIUM

BACKGROUND OF THE INVENTION

1. Field of the Invention

This invention relates to an image processing method and apparatus suitably employed in an image printing apparatus employing a printer connected in circuit over an interface conforming to the IEEE (The Institute of Electrical and Electronics Engineers) 1394 standard. This invention also relates to an image printing method and apparatus, an image printing system, an image printing method, and to a storage medium having stored therein an image processing and printing program.

2. Description of Related Art

The IEEE (The Institute of Electrical and Electronics Engineers) 1394 standard provides for the physical standard and the electrical standard for connectors for interconnection provided in respective equipments. The equipments provided with an interface pursuant to the IEEE 1394 standard are physically interconnected to realize e.g., the hot plug and play automatically executing high-speed digital data transmission/reception and connection setting between the respective equipments, such that the IEEE 1394 standard is widespread as the serial interface standard of the relevant technical field.

Moreover, this IEEE 1394 standard is widespread not only in the field of a computer but also as an interface interconnecting AV equipments. Specifically, when a STB (set top box), receiving the satellite broadcast to display the received broadcast on a television device, and a printer device, printing an image, are interconnected over an IEEE 1394 interface, the STB controls the printer apparatus using an FCP (function control protocol) and AV/C protocol. The STB and the printer device mount an FCP and an AV/C protocol, and operate in accordance with FCP and AV/C commands.

If, in the image printing apparatus, provided with a printer device, mounting the AV/C protocol and the FCP, interconnected over the conventional IEEE 1394 interface, and with a controller for controlling the printer device, a still image is to be printed, a setting item, defined by an operation mode (operation_mode_parameters), specifying the information for printing setting, is designated by the controller and stored in an asynchronous packet to have the still image printed by the printing device. At this time, the controller performs printing setting responsive to a user's request. This printing setting has been proposed in e.g., a publication entitled "1394 trade association TA document XXXXXX AV/C Printer Subunit Specification Version 1.0 Draft 0.5:145".

Specifically, when the controller controls the printing by the printer device, the sizing information for setting the relative size of the image and the printing sheet in three steps of large, medium and small, the orientation information for setting the printing direction of the printing sheets, the information for setting the image printing position (posx, posy), the information specifying how many of the same images are to be printed in a printing sheet (multiple_tiled), the information specifying how many images are to be printed in one page (number_of_pic), and the information specifying how many copies are to be prepared (number_of_copies), are set by the user and included into an asynchronous packet, which is transmitted to the printing device for printing.

Heretofore, in a conventional printer device, connected to the computer, printing is made as a variety of modes, such as a picture quality priority mode or a speed priority mode, are set by a device driver installed on the side computer. The picture quality priority mode is such a mode in which image data of a fine resolution are prepared and sent to the printer device, whilst the speed priority mode is such a mode in which an image with a decreased data volume is prepared and sent to the printing device. If the device driver is used to set the mode, it is up to the computer side transmitting an image to prepare an image required to be printed, thus placing a severe load on the computer. Moreover, when an image is to be transmitted from a television receiver, such as a set top box, to the printer device, severe load is imposed similarly on the television receiver. The same applies for a personal computer recently developed to enable reception of the television broadcast.

In a DPP (direct printing protocol), well-known as a print protocol for IEEE 1394, the quality of an image that can be received on the side printer and that of the image that can be sent by the side computer are exchanged to determine the image to be transmitted or received. In this DPP, severe load is similarly imposed on the computer or on the set top box.

That is, when an image outputted by the set top box or the television receiver is transmitted to the printer device over the IEEE 1394 interface to print the image, severe load is imposed on the side controller of the set top box or the television receiver.

SUMMARY OF THE INVENTION

It is therefore an object of the present invention to provide an image processing method and apparatus in which the apparatus is connected to the printing device over an interface conforming to the printing device over an interface pursuant to the IEEE 1394 standard and in which the processing for preparing for printing is simplified to cope with variable printing demands without imposing severe load on the printing apparatus.

It is another object of the present invention to provide a printing method and apparatus in which the printing apparatus is connected to an image processing apparatus over an interface pursuant to the IEEE 1394 standard and in which the processing for preparing for printing is simplified to allow for coping with variable printing demands without imposing severe load on the image processing apparatus.

It is still another object of the present invention to provide an image printing method and system in which an image processing apparatus is connected to a printing apparatus over an interface pursuant to the IEEE 1394 standard and in which the processing for preparing for printing is simplified to allow for coping with variable printing demands without imposing severe load on the image processing apparatus.

It is yet another object of the present invention to provide a recording medium having stored therein an image processing program and a printing program, adapted to an interface pursuant to the IEEE 1394 standard, in which the processing for preparing for printing is simplified to allow for coping with variable printing demands without imposing severe load on the image processing apparatus.

Meanwhile, the present Assignee proposed for the IEEE 1394 Trade Association the contents of the JP Patent Application No. H-11-233253 and JP Patent Application No. H-11-261276, for standardization. The contents of these proposals were laid open in the IEEE 1394 Trade Association as the following drafts:

AV/C Printer Subunit Specification Version 1.0 Draft 0.97: 60 (2Q00 AVWG Off-Cycle Meeting on May 24-25, 2000);

AV/C Printer Subunit Specification Version 1.0 Draft 0.7:5 (1Q00 TA QM AV-WG on Jan. 18, 2000); and AV/C Printer Subunit Specification Version 1.0 Draft 0.5: 145 (3Q99 TA QM AVWG Meeting on Jul. 28-30, 1999).

In accordance with the present invention, there is provided an image printing method wherein desired still image data corresponding to image data inputted from outside is generated, the printing control information for controlling a printing device is generated, the generated printing control information is defined by an AV/C command set consistent with an FCP (function control protocol) pursuant to the IEEE (The Institute of Electrical and Electronic Engineers) 1394 standard, for transmission to the printing device, the so-generated still image data is included in a packet pursuant to the IEEE 1394 standard, and the resulting packet is transmitted to the printing device, and wherein the printing control information transmitted from the image processing device is received, the still image data transmitted from the image processing device is received and the still image data is printed based on the so-received printing control information.

In accordance with the present invention, there is also provided a printing method including inputting the printing control information defined in an AV/C command set consistent with an FCP (function control protocol) pursuant to the IEEE (The Institute of Electrical and Electronic Engineers) 1394 standard, inputting still image data included in a packet pursuant to the IEEE1394 standard, and printing the still image data in accordance with the input printing control information.

In accordance with the present invention, there is also provided an image printing method wherein, on the side image processing device, desired still image data corresponding to image data inputted from outside is generated, the printing control information for controlling a printing device is generated, the generated printing control information is defined by an AV/C command set consistent with an FCP (function control protocol) pursuant to the IEEE (The Institute of Electrical and Electronic Engineers) 1394 standard, for transmitting the information to the printing device, and the so-generated still image data is included in a packet pursuant to the IEEE 1394 standard for transmitting the resulting packet to the printing device, and wherein, on the side printing device, the printing control information transmitted from the image processing device is received, the still image data transmitted from the image processing device is received and the still image data is printed based on the so-received printing control information.

In accordance with the present invention, there is also provided an image printing method wherein, on the side image processing device, desired still image data corresponding to image data inputted from outside is generated, the printing control information for controlling a printing device is generated, the generated printing control information is defined by an AV/C command set consistent with an FCP (function control protocol) pursuant to the IEEE (The Institute of Electrical and Electronic Engineers) 1394 standard, for transmitting the information to the printing device, and the so-generated still image data is included in a packet pursuant to the IEEE 1394 standard for transmitting the resulting packet to the printing device, and wherein, on the side printing device, the printing control information transmitted from the image processing device is received, the still image data transmitted from the image processing device is received and the still image data is printed based on the so-received printing control information.

In accordance with the present invention, there is also provided a recording medium having stored therein an image processing program, wherein the image processing program includes generating desired still image data corresponding to image data inputted from outside, generating the printing control information for controlling a printing device, defining the generated printing control information by an AV/C command set conforming to an FCP (function control protocol) pursuant to the IEEE (The Institute of Electrical and Electronic Engineers) 1394 standard for outputting the resulting information to the printing device, having the generated still image data included in a packet pursuant to the IEEE 1394 standard, and outputting the resulting packet to the printing device.

In accordance with the present invention, there is also provided a recording medium having stored therein a printing program, wherein the printing program includes inputting the printing control information defined in an AV/C command set consistent with an FCP (function control protocol) pursuant to the IEEE (The Institute of Electrical and Electronic Engineers) 1394 standard, inputting still image data included in a packet pursuant to the IEEE1394 standard, and printing the still image data in accordance with the input printing control information.

BRIEF DESCRIPTION OF THE DRAWINGS

FIG. 6 illustrates an image type of a still image.

FIG. 7 illustrates a data structure of an asynchronous packet containing a capture command.

FIG. 8 illustrates the appellation of an image type stored in the image_format_specifier.

FIG. 9 illustrates another example of an image type stored in the image_format_specifier.

FIG. 10 illustrates an image data transmitting sequence in point-sequentially transmitting still image data of the YCC 4:2:2 pixel format to the printing device.

FIG. 11 illustrates an image data transmitting sequence in point-sequentially transmitting still image data of the YCC 4:2:0 pixel format to the printing device.

FIG. 12 illustrates an image data transmitting sequence in line-sequentially transmitting still image data of the YCC 4:2:2 pixel format to the printing device.

FIG. 13 illustrates an image data transmitting sequence in line-sequentially transmitting still image data of the YCC 4:2:0 pixel format to the printing device.

FIG. 14 illustrates point-sequential transmission of a still image with an image type of 480_422_4×3.

FIG. 15 illustrates point-sequential transmission of a still image with an image type of 480_420_4×3.

FIG. 16 illustrates line-sequential transmission of a still image with an image type of 480_422_4×3.

FIG. 17 illustrates line-sequential transmission of a still image with an image type of 480_420_4×3.

FIG. 19 illustrates the contents of a subfunction contained in the operation mode 2 command.

FIG. 20 illustrates the contents of operation_mode2_parameters contained in the operation mode 2 command.

FIG. 21 illustrates the contents of media_type contained in the operation_mode 2_parameters.

FIG. 22 illustrates the meaning and contents of respective setting items contained in media_type.

FIG. 23 illustrates an example of contents of media_size contained in the Operation_mode2_parameters.

FIG. 24 illustrates an example of the meaning and contents of respective setting items contained in media_size.

FIG. 25 illustrates another example of the contents of media_size contained in the operation_mode 2_parameters.

FIG. 26 illustrates another example of the meaning and contents of respective setting items contained in media_size.

FIG. 27 illustrates still another example of the meaning and contents of respective setting items contained in media_size.

FIG. 29 illustrates the meaning and contents of respective setting items contained in the print_quality.

FIG. 31 illustrates an example of the meaning and contents of respective setting items contained in mono_color.

FIG. 33 illustrates another example of the meaning and contents of respective setting items contained in mono_color.

FIG. 34 illustrates the contents of offset contained in the operation_mode 2_parameters.

FIG. 35 illustrates the meaning and contents of respective setting items contained in the offset.

FIG. 37 illustrates the meaning and contents of layout_type.

FIG. 39 illustrates the meaning and contents of respective setting items contained in a command packet containing an operation mode command.

FIG. 43 illustrates a response packet to a command packet containing a control command and the control packet when the STB and the printing device are associated only with standard setting.

FIG. 44 illustrates a response packet to a command packet containing a status command and the status packet when the STB and the printing device are associated only with standard setting.

FIG. 45 illustrates a response packet for a command packet containing a control packet and the control packet when the STB is associated only with standard setting and the printing device is associated with standard setting and extension setting.

FIG. 46 illustrates a response packet for a command packet containing a status packet and the status packet when the STB is associated only with standard setting and the printing device is associated with standard setting and extension setting.

FIG. 47 illustrates a response packet for a command packet containing a control packet and the control packet when the STB is associated with standard setting and the extension setting and the printing device is associated only with standard setting.

FIG. 48 illustrates a response packet for a command packet containing a status packet and the status packet when the STB is associated with standard setting and the extension setting and the printing device is associated only with standard setting.

FIG. 49 illustrates a response packet for a command packet containing a control packet and the control packet when the STB and the printing device are associated with the standard setting and with the extension setting.

FIG. 50 illustrates a response packet for a command packet containing a status packet and the status packet when the STB and the printing device are associated with the standard setting and with the extension setting.

DESCRIPTION OF THE PREFERRED EMBODIMENTS

Figure 1:
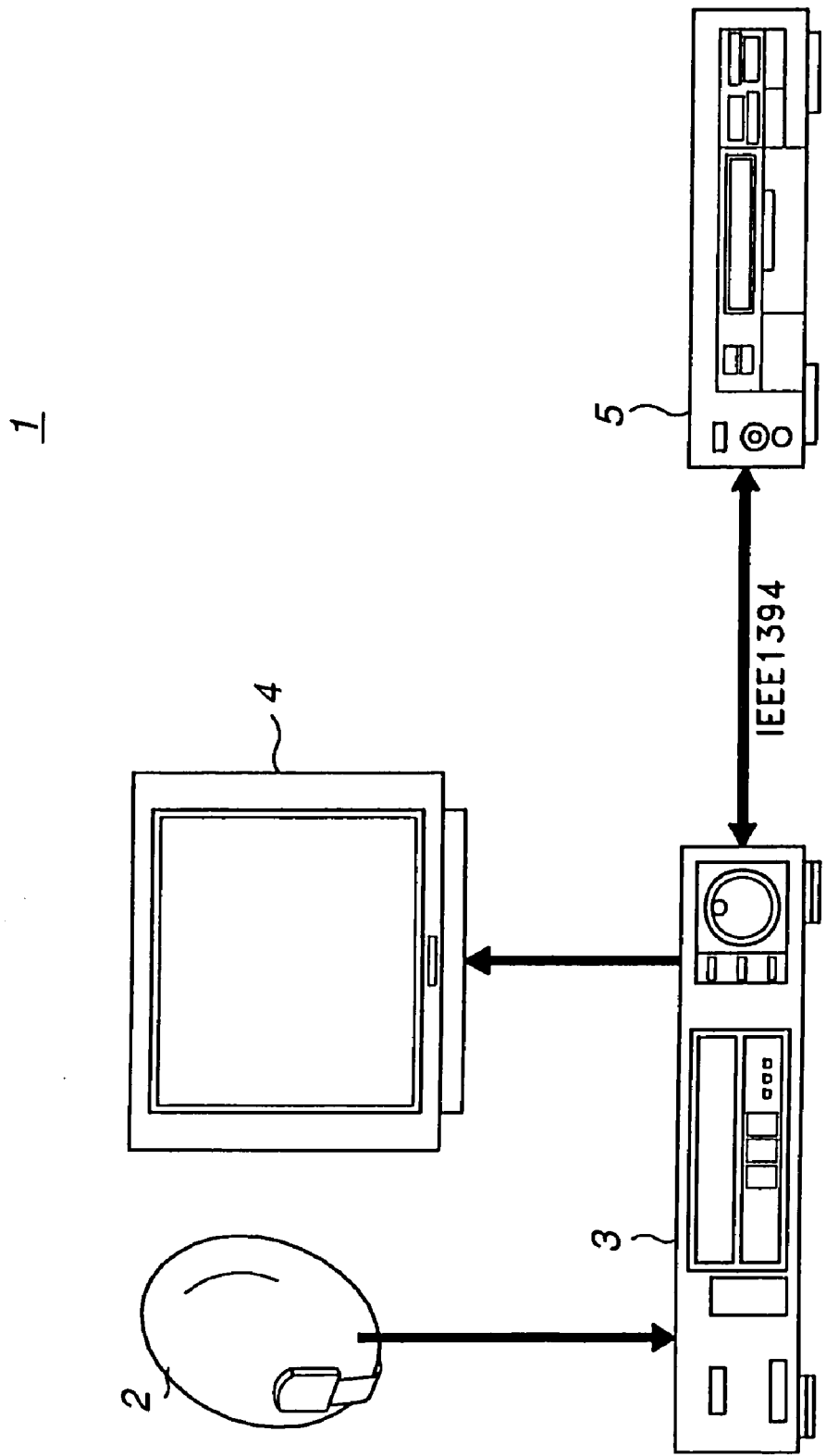
FIG. 1 illustrates an image printing system embodying the present invention.

Referring to the drawings, preferred embodiments of the present invention will be explained in detail.

An image printing system 1, embodying the present invention is configured as shown for example in FIG. 1.

This image printing system 1 is made up of an antenna 2 for receiving a moving picture broadcast using e.g., a communication satellite, a set top box (STB) 3 for processing the received moving picture data in a pre-set fashion, a television device 4 for displaying moving pictures and an still image and a printing device 5 for printing and outputting an image.

The antenna 2 receives image signals representing a moving picture to output the image signals to the STB 3. The image signal, received by the antenna 2, has multi-channel image signals superposed thereon. The image signal is comprised of moving picture data compressed in accordance with e.g., the MPEG (Moving Picture Experts Group) system and which is ciphered in accordance with a pre-set encryption system.

The television device 4 is fed with moving picture data of the NTSC (National Television System Committee) system through the STB 3 to display moving pictures. Moreover, if the television device 4 is the HD (high definition) TV, moving picture data pursuant to the HD standard are fed from the STB 3 to display moving pictures. In addition, this television device 4 has the display state controlled by the STB 3 to display a still image and other letter information.

Figure 2:
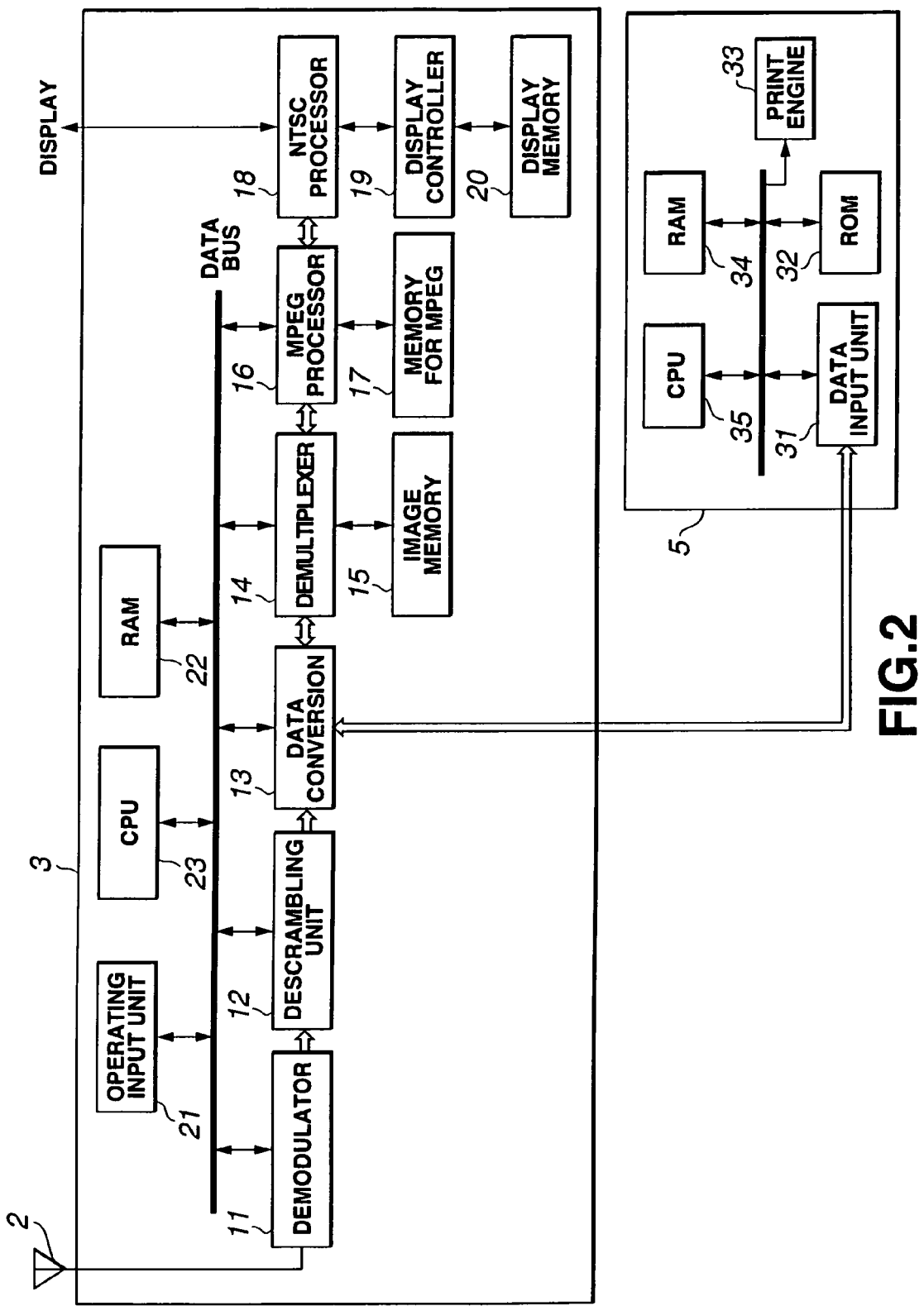
FIG. 2 is a block diagram showing the structure of an STB and a printer apparatus constituting an image printing system embodying the present invention.

Referring to FIG. 2, the STB 3 includes a demodulator 11 for demodulating picture signals received over the antenna 2, a descrambling unit 12 for deciphering the moving picture data, a data conversion unit 13 for performing data conversion pursuant to the IEEE 1394 standard, a demultiplexer 14 for extracting moving picture data in a pre-set channel, an image memory 15, an MPEG processor 16 for performing decoding, a decoding memory 17, an NTSC processor 18 for performing data conversion for display on the television device 4, a display controller 19, and a display memory 20. The STB 3 also includes an operation inputting unit 21, for inputting a command from a user, a RAM (random access memory) 22 and a CPU (central processing unit) 23 for controlling various components.

This STB 3 has the demodulator 11, descrambling unit 12, data conversion unit 13, demultiplexer 14, MPEG processor 16, operation inputting unit 21, RAM 22 and the CPU 23 connected to the bus so that the processing operations of the variable portions will be controlled by the CPU 23 over the bus.

To the demodulator 11 are fed picture signals of the analog system specifying a moving picture stream from the antenna 2. This demodulator 11 processes the picture signals from the antenna 2 with demodulation and A/D conversion to generate digital moving picture data which is outputted to the descrambling unit 12. The demodulator 11 is also fed over the bus with control signals from the CPU 23 to perform demodulation and A/D conversion based on the control signals.

The descrambling unit 12 decrypts the moving picture data from the demodulator 11. That is, the descrambling unit 12 is fed with ciphered moving picture data to perform deciphering in accordance with the encryption system of the input moving picture data. The descrambling unit 12 outputs the deciphered moving picture data to the data conversion unit 13. This descrambling unit 12 is fed from the CPU 23 with the control signals over the bus and performs decryption using the encryption key information contained in the control signals.

The data conversion unit 13 is comprised of an interfacing circuit, in meeting with e.g., the IEEE 1394 standard, and is responsive to the control signals from the descrambling unit 12, in accordance with the IEEE 1394 standard, to process the input moving picture data or still image data such as to have the input moving picture data or still image data contained in a packet pursuant to the IEEE 1394 standard. In transmitting temporally continuous data, such as moving picture data, the data conversion unit 13 generates an isochronous packet, whereas, in transmitting static data, such as still image data or connection setting data, the data conversion unit 13 generates an asynchronous packet 100, as shown in FIG. 3.

Figures 3, 4:
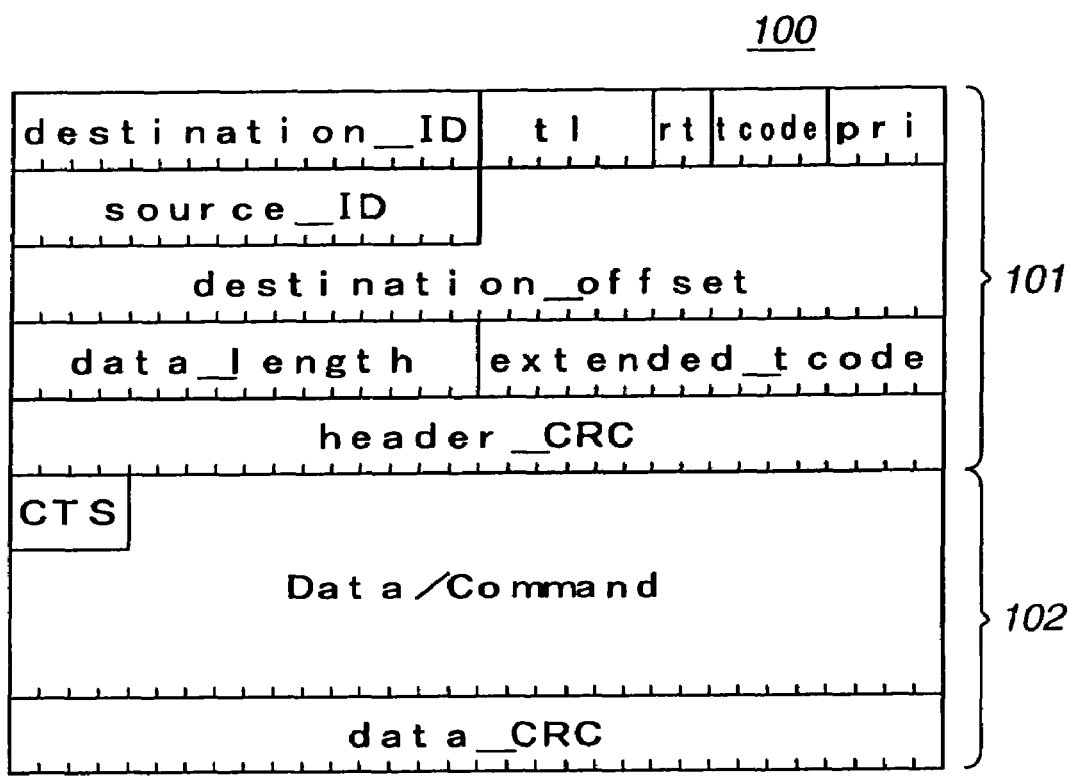
FIG. 3 illustrates a data structure of an asynchronous packet transmitted/received between the STB and the printer device.
FIG. 4 is a plan view showing a data structure of a data portion of the asynchronous packet.

This asynchronous packet 100, shown in FIG. 3, includes a header 101, pursuant to the IEEE 1394 standard, and a data portion 102.

In the header 101 are stored an ID of a packet receiving side, that is a destination ID (destination_ID) of the printing device 5, a transaction label (tl), a retry code (rt), a transaction code (tcode), priority (pri), an ID of a packet transmitting side, that is a transmitting side ID (source_ID) specifying an ID of the packet transmitting side, that is STB 3, destination_offset specifying a memory address of the packet receiving side, a data field length (data_length), an extended transaction code (extended_tcode) and a header CRC (header_CRC; CRC of the header field) indicating the CRC for the header 101.

In the data portion 102 are stored a data field and a data CRC (data_CRC) indicating the CRC for the header 102. In the data field are stored data in meeting with FCP (function control protocol) and the AV/C protocol.

In the data field are stored the CTS (command transaction set), command type, a subunit type (subunit type) indicating the subunit type of the packet reception side, and a subunit ID (subunit_ID) indicating the ID of the type of the subunit of the packet receiving side, as shown in FIG. 4. The subunit of the packet receiving side corresponds to a data inputting unit 31 of the printing device 5, whilst the type of the subunit of the packet receiving side is represented by "00010" in the case of the printing device 5.

In the data field, still image data (data) transmitted to the printing device 5 and a command (command) to the printing device 5 are stored in succession to the sub-unit ID. The command to be stored in the data field is a command contained in a command set, called an AV/C command, for controlling the printing device 5. The CTS classes the types of the FCP. If the packet to be transmitted is a command, and has a value 0000, an AV/C command, defined in the AV/C digital interface command set of IEEE 1394, is stored in the data field of the data portion 102.

When outputting an asynchronous packet, the data conversion unit 13 transmits it at regular intervals.

Figure 5:
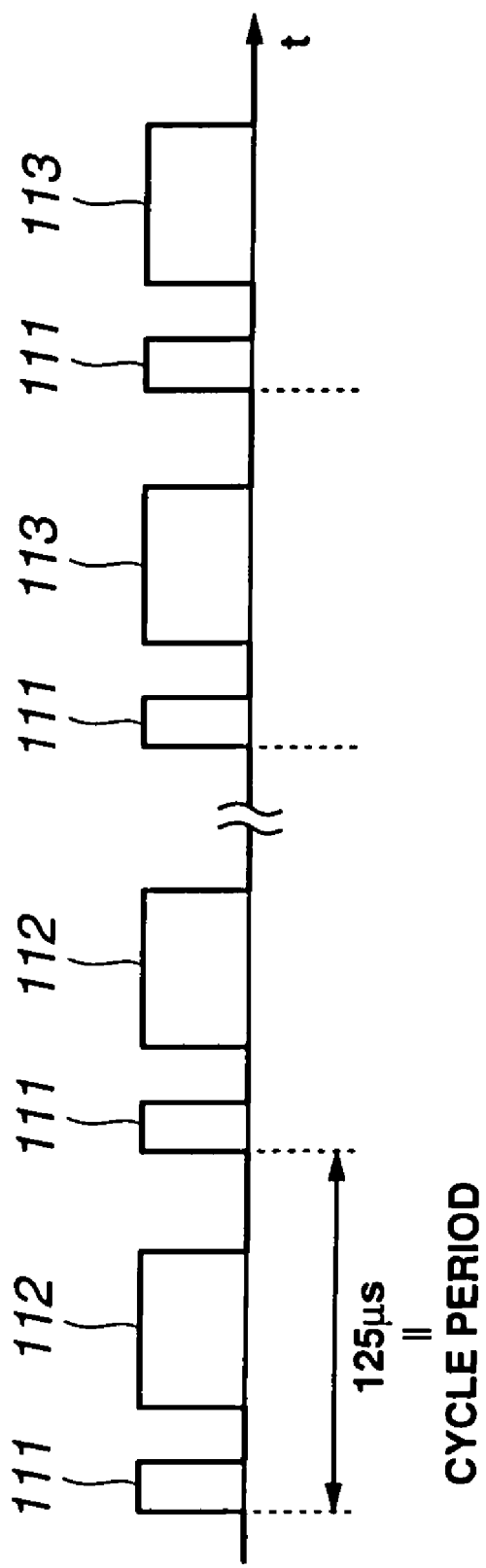
FIG. 5 is a timing chart in transmitting an asynchronous packet from a data conversion unit to a data input unit.

When the data conversion unit 13 causes still image data printed by the printing device 5 to be included in the asynchronous packet 100, for transmission, the data conversion unit 13 transmits the asynchronous packet 100 at a cycle period of 125 μsec, as shown in FIG. 5. The data conversion unit 13 first transmits a cycle start packet 111, which is the asynchronous packet 100 including cycle time data (cycle_time_data) indicating the cycle start (cycle start) and, via a pre-set time gap, sends a command packet 112 including a capture command in the data portion 102 indicating the effect that still image data, for example, is to be sent. At each cycle period, the data conversion unit 13 sends a data packet 113, which has stored still image data in the data portion 102, to the printing device 5, which has received the capture command.

When outputting still image data to the printing device 5, the data conversion unit 13 follows an asynchronous arbitration. When outputting the still image data to the printing device 5, the data conversion unit 13 outputs each asynchronous packet 100, including still image data, responsive to a response from the printing device 5.

Specifically, this data conversion unit 13 performs processing in the transaction layer, link layer and in the physical layer under serial management pursuant to the IEEE 1394 standard. Thus, the data conversion unit 13 sets the connection to the printing device 5, under control by the CPU 23, and generates the asynchronous packet 100, including still image data and an overhead, as the control information, to transmit the asynchronous packet 100 at each cycle period to the printing device 5, connected in circuit, in accordance with the IEEE 1394 standard, by way of performing time divisional control.

When directly displaying the moving picture data, received by the STB 3, by the television device 4, without performing the processing pursuant to the IEEE 1394 standard, the data conversion unit 13 outputs moving picture data from the descrambling unit 12 to the demultiplexer 14, based on the control signal from the CPU 23.

The demultiplexer 14 performs channel selection processing of selecting the channel selected by the CPU 23, from the plural channels superposed on the moving picture data from the data conversion unit 13, to output only the moving picture data, indicating the designated channel, to the MPEG processor 16.

The demultiplexer 14 is fed from the MPEG processor 16 with still image data, composed of the luminance information and the chroma information, under control by the CPU 23, and stores the still image data in the image memory 15 to output the stored data to the data conversion unit 13 under control by the CPU 23.

Based on the control signal from the CPU 23, the MPEG processor 16 decodes the moving picture data from the demultiplexer 14, in accordance with the MPEG standard, to process the moving picture data into non-compressed moving picture data, which is outputted to the NTSC processor 18. The MPEG processor 16 processes each frame constituting a moving picture into an image composed of pixel data containing the luminance information Y and the chroma information Cr, Cb. At this time, the MPEG processor 16 stores the moving picture data being decoded, with plural frames of the moving picture data as a unit, from time to time, in the memory for MPEG 17, as the MPEG processor 16 uses the memory for MPEG 17 as a work area.

The MPEG processor 16 generates a YCC image of a 4:2:2 pixel format in which the sampling frequency ratio of the luminance information Y, chroma information Cr and the chroma information Cb is set to 4:2:2, that is in which the chroma information Cr, Cb is reduced to one half of the luminance information Y in the vertical or horizontal direction. The MPEG processor 16 also generates a YCC image of a 4:2:0 pixel format in which the chroma information Cr, Cb is reduced to one half the luminance information Y in the vertical and horizontal directions. In the 4:2:0 pixel format, an odd line is free of the chroma information Cb to provide the sampling frequency ratio of 4:2:0, whereas the even line is free of the chroma information Cr to provide the sampling frequency ratio of 4:0:2. This pixel format is represented by 4:2:0. It is possible for the MPEG processor 16 to generate a YCC image of a 4:4:4 pixel format, in which the chroma information Cr, Cb is not curtailed, in place of the 4:2:2 or 4:2:0.

Based on the control signal indicating the compression ratio etc from the CPU 23, the MPEG processor 16 encodes the moving picture data from the NTSC processor 18, in accordance with the MPEG standard, to compress the moving picture data in the time axis direction and in the spatial direction, to output the resulting compressed moving picture data to the demultiplexer 14. At this time, the MPEG processor 16 stores moving picture data, being encoded, in the memory for MPEG 17, with plural frames of the moving picture data as a unit.

The NTSC processor 18 encodes the moving picture data, inputted from the MPEG processor 16, into moving picture data of the NTSC system, that can be displayed on the television device 4, to output the resulting moving picture data to the television device 4.

The display controller 19 processes the moving picture data inputted from the MPEG processor 16 for display on the television device 4. The display controller 19 causes the data for processing to be stored from time to time in the display memory 20.

Specifically, this display controller 19 manages control to set the image size of an image displayed on the television device 4, from one frame displayed on the television device 4 to another, to 720 by 480 pixels of the NTSC system or to 1920 horizontal pixels by 1080 vertical pixels of the HD (high definition) system, depending on the type of the television device 4. In generating one-pixel data, the display controller 19 outputs the one-pixel data to the television device 4 using the 16-bit information used in the 4:2:2 pixel format in which the sampling frequency ratio of the luminance signal Y, chroma signal Cr and the chroma signal Cb is 4:2:2, or using the information used in the 4:2:0 pixel format in which the sampling frequency ratio of the luminance signal Y, chroma signal Cr and the chroma signal Cb is 4:2:0.

It is possible for the display controller 19 to output an image of the image type, which has defined the image size (pixel_x, pixel_y), scanning system (interlaced/progressive), pixel format, screen aspect ratio, pixel aspect ratio and data volume (image size), instead of outputting data by the above-described system, as shown in FIG. 6. In this figure, the image type with the pixel_y of 720 pixels, the pixel format of 4:2:2 and with the screen aspect ratio of 16:9, is termed 720__422__16×9. It is noted that the display controller 19 also is able to generate an image of 720__422__16×9 and an image of 720__420__16×9, which is the image type of the digital TV broadcasting system used in USA. The display controller 19 is also able to generate an image of 576__422__4×3 and an image of 522__420__4×3, which is the image type of the PAL (phase alternation by line) system.

When the user acts on an actuating button provided on e.g., the STB 3, the operation inputting unit 21 generates an operation input signal to output the signal to the CPU 23. Specifically, subject to actuation of the operating button etc by the user, the operation inputting unit 21 generates an operating input signal instructing the moving picture displayed on the television device 4 to be temporarily halted to print a still image by the printing device 5.

When generating an actuating input signal instructing the printing device 5 to print a still image, the operation inputting unit 21 is responsive to the printing setting picture displayed on the television device 4 to generate an operating input signal specifying the setting for printing sheet type, printing sheet size, printing quality, printing color, position offset and layout to output the generated operating input signal to the CPU 23.

Based on the operating input signal from the operation inputting unit 21, the CPU 23 generates a control signal controlling the above-mentioned respective parts of the STB 3.

If the picture signals received over the antenna 2 are displayed on the television device 4, the CPU 23 outputs a control signal to each of the demodulator 11, descrambling unit 12, data conversion unit 13, demultiplexer 14 and the MPEG processor 16 to manage control to process the moving picture data with demodulation, decryption, channel selection and with decoding in meeting with the MPEG standard.

If, of the moving pictures displayed on the television device 4, a frame-based still image is to be captured by an operating input signal from the operation inputting unit 21, the CPU 23 generates a control signal to read-in the frame-based still image stored in the display memory 20 at a time point of inputting the operating input signal in the image memory 15.

When fed with the operating input signal for printing setting from the operation inputting unit 21, the CPU 23 controls the display controller 19 to demonstrate a printing setting image on the television device 4 and to output an operating input signal consistent with the above-mentioned various printing settings to the data conversion unit 13.

43.

When fed with an operating input signal instructing the printing device 5 to print a picture which has yielded still image data, the CPU 23 controls the demultiplexer 14 and the data conversion unit 13 to output a YCC image, as a frame-based still image data stored in the image memory 15, composed of the luminance information L and the chroma information Cr, Cb, to the printing device 5 via the data conversion unit 13 as the interfacing circuit pursuant to the IEEE 1394 standard.

When transmitting still image data to the printing device 5, under control by the CPU 23, the data conversion unit 13 sends the asynchronous packet 100, having stored therein a capture command shown in FIG. 7, in succession to the sub-unit ID shown in FIG. 4, under control by the CPU 23, to transmit the capture command for receiving the still image data to the printing device 5.

In the capture command, shown in FIG. 7, a capture command, represented in hexadecimal $XX_{16}$, is stored as an opcode (operation code). Then, a subfunction is stored as operand [0], source_subunit_type and source_subunit_ID are stored in the upper 5 bits and in the lower 3 bits, as an operand [1], respectively, source_plug is stored as operand [2], status is stored as operand [3] and dest_plug is stored as operand [4]. In the capture command, print_job_ID is stored as operand [5] to operand [16], data_size is stored as operand [21] to operand [20], image_size_x is stored as operand [21] to operand [22], image_size_y is stored as operand [23] to operand [24], image_format_specifier is stored as operand [25], operand [27] to operand [29] are set as reserved, Next_pic is stored as operand [30] and Next age is stored as operand [31] to operand [32].

The source_subunit_type is the information specifying the type of the subunit transmitting the asynchronous packet 100 on the side STB 3. The source_subunit_ID is an ID of the subunit transmitting the asynchronous packet 100. The source_plug is a plug number of the subunit transmitting the asynchronous packet 100. The dest_plug is the plug number of the subunit receiving the asynchronous packet 100. The print_job_ID is the ID of the processing (job) of printing a sill image. The data_size is the date volume transmitted from the STB 3 to the printing device 5 when printing a still image by the printing device 5. The image_size_x is the number of pixels in the x-direction corresponding to the image type shown in FIG. 6. The image_size_y is the number of pixels in the y-direction corresponding to the image type. The image_format_specifier is the appellation of the above image type. The reserved is made up of an optional number of bits and is provided in order that the number of bits of the capture command in its entirety will be a multiple of 4. By providing the reserved, the number of bits is convenient for the data unit when transmitting the packet pursuant to the IEEE 1394 standard.

In the image_format_specifier, the appellation of the image type is stored as it is identified by hexadecimal values, as shown in FIG. 8. In this figure, "chunky" in the appellation of the image type denotes that the image is the still image transmitted point-sequentially from the data conversion unit 13 to the printing device 5, whereas "liner" denotes that the image is the still image transmitted line-sequentially from the data conversion unit 13 to the printing device 5

It is also possible for the image_format_specifier to contain not only the appellation of the image type, as shown in FIG. 8, but also the appellation of the image type expressed by the hexadecimal value (sub-value) and not containing the information pertinent to the number of pixels in distinction from the image type shown in FIG. 8, as shown in FIG. 9. At this time, the number of pixels printed by the printing device 5 is defined by the image_size_x described in the operand [21] and operand [22] and by the image_size_y described in the operand [23] and operand [24] of the capture command shown in FIG. 7.

For example, 00 in hexadecimal, stated in the msb of the image_format specifier (meaning: sRGB raw), indicates that the image data is transmitted as RGB data to the printing device 5. Moreover, if 00 in hexadecimal is stated in the msb of the image_format_specifier, RGB data are transmitted in the order of R, G, B, R, G, B, . . . when 00 in hexadecimal is stated in its lsb (Type: sRGB raw), and in the order of R, G, B, 0, R, G, B, 0, . . . when 01 in hexadecimal is stated in its lsb (Type: sRGB raw, quadlet). That is, if 00 is stated in the msb, data 0 is transmitted between B and R to transmit R, G, B, 0 as one-unit 4-byte data.

Also, if 01 in hexadecimal is stated in the msb of the image_format_specifier (meaning: YCC raw), it indicates that image data is to be sent as YCC data to the printing device 5. If 01 is stated in hexadecimal in the msb of the image_format_specifier, it indicates that the luminance information and the chroma information are to be transmitted point-sequentially (chunky) as 4:2:2 pixel format data in case 0X is stated in the lsb (type: YCC 4:2:2 raw/pixel); that the luminance information and the chroma information are to be transmitted line-sequentially (liner) as 4:2:2 pixel format data in case IX is stated in the lsb (type: YCC 4:2:2 raw/line); that the luminance information and the chroma information are to be transmitted point-sequentially (chunky) as 4:2:0 pixel format data in case 8X is stated in the lsb (type: YCC 4:2:2 raw/chunky); and that the luminance information and the chroma information are to be transmitted line-sequentially (liner) as 4:2:0 pixel format data in case 9X is stated in the lsb (type: YCC 4:2:0 raw/line), where X is an indefinite number.

If 01 is stated in hexadecimal in the msb of the image_format_specifier (meaning: YCC raw), and X0 to XC in hexadecimal is stated in its lsb, the pixel ratio (Pixel ratio 1.00× 1.00, Pixel ratio 1.19×1.00 or the Pixel ratio 0.89×1.00), the color space (ITU-R (International Telecommunications Union-Radiocommunication Sector) BT. 709-2, ITU-R BT. 601-4 or ITU-R BT. 1203), point-sequential (chunky) or line-sequential (liner) is specified to transmit the data. If X0 to X4 in hexadecimal or X8 to XC in hexadecimal is stated in the lsb, it indicates that an interlaced picture or a progressive picture is to be transmitted, respectively. Moreover, if X0 to X2 and X8 to XA are stated in the lsb, it indicates that data pursuant to ITU-R BT. 709-2 is to be transmitted, whereas, if X3 and XB are stated in the lsb, it indicates that data pursuant to ITU-R BT. 601-4 is to be transmitted. If X4 and XC are stated in the lsb, it indicates that data pursuant to ITU-R BT. 1203 (PAL system) is to be transmitted.

If 10 in hexadecimal is stated in the image_format_specifier (meaning: DCF Object), it indicates that image data is to be transmitted to the printing device 5 in the format specified for the digital camera (DCF: design rule for camera format). If 10 in hexadecimal is stated in the msb of the image_format_specifier and 00 in hexadecimal is stated in its lsb, it indicates that the data of the Exif form is to be transmitted, in which the image portion is of the JPEG system and to which is appended a header recording the photographing state or conditions. If 01 in hexadecimal is stated in the lsb (type: JFIF (JPEG file interplay format), it indicates that data of the JFIF form is to be transmitted, whereas, if 02 is stated in the lsb (type: TIFF (tag image file format)), it indicates that data of the TIFF is to be transmitted. If 0F is stated (type; JPEG (joint photographic coding experts group)), it indicates that image data is to be transmitted to the printing device 5 in the JPEG form.

If 80 to 8F is stated in hexadecimal in the msb of the image_format_specifier, it indicates that transmission is to be done in other formats and data of the format specified in 00 to FF stated in the lsb is transmitted.

In the image_format_specifier, FE in hexadecimal (meaning: special meaning) may be set in the msb, whilst 00 (type: unit plug defined) and 01 (don't care) may be set in the lsb.

The data conversion unit 13 transmits the asynchronous packet 100, having stored therein the capture command, and receives an ACK (acknowledge) from the printing device 5, after which it transmits the asynchronous packet 100 containing the still image data to the printing device 5.

The still image data transmission rule is as shown in FIGS. 10 to 13.

FIG. 10 shows the image data transmission sequence when transmitting still image data of the YCC 4:2:2 pixel format point-sequentially (chunky) to the printing device 5. FIG. 11 shows the pixel data transmission sequence when transmitting the still image data of the YCC 4:2:0 pixel format point-sequentially (chunky) to the printing device 5. FIG. 12 shows the image data transmission sequence when transmitting still image data of the YCC 4:2:2 pixel format line-sequentially (liner) to the printing device 5. FIG. 13 shows the pixel data transmission sequence when transmitting the still image data of the YCC 4:2:0 pixel format line-sequentially (liner) to the printing device 5.

In FIGS. 10 to 13, $Y_i(L_j)$ denotes the luminance information Y of the pixel number i contained in the line number j, where i, used when specifying a pixel in the luminance information Y, is an integer from 1 to N, and j is an integer from 1 to M. $Cb_i(L_j)$ denotes the chroma information Cb of the pixel number i contained in the line number j, where i, used for designating a pixel of the chroma information Cb, is of a value of 1, 3, 5, ..., N−1, whereas j is of an integer value from 1 to M for YCC 4:2:2 and is of a value of 1, 3, 5, ..., N−1 for YCC 4:2:0. $Cr_i(L_j)$ denotes the chroma information Cr of the pixel number i contained in t the line number j, where i, used for designating a pixel of the chroma information Cr, is of a value of 1, 3, 5, ..., N−1, whereas j is of an integer value from 1 to M for YCC4:2:2 and is of a value of 1, 3, 5, ..., N−1 for YCC 4:2:0. N and M denote the total number of pixels in a line and the total number of the pixels in an image, respectively.

When point-sequentially (chunky) transmitting still image data to the printing device 5, in which the still image having the image type of FIG. 8 of 480_422_4×3 is contained in the asynchronous packet 100, with the pixels bearing pixel numbers from 1 to 720 and from 1 to 480 in the x-direction and in the y-direction, respectively, the data conversion unit 13 transmits the pixel data as shown in FIG. 14.

That is, the data conversion unit 13 transmits, next to the address offset (address_offset), the luminance information Y1(L1), luminance information Y2(L1), chroma information Cb1 (L1) and the chroma information Cr1(L1), for the pixel number 1 contained in the line number 1. The data conversion unit 13 transmits, next to the pixel data up to the pixel numbers 720, contained in the line number 1, the luminance information and the chroma information as from the net line number 2 until it transmits the pixel data up to the pixel number 720 contained in the line number 480 to complete the transmission of the still image data representing a sole still image.

If the image type is 480_420_4×3, the data conversion unit 13 transmits, next to the address offset (address_offset), the luminance information Y1(L1), luminance information Y2(L1), luminance information Y1 (L2) and the luminance information Y2(L2), for the pixel number 1 contained in the line number 1, as shown in FIG. 15. The data conversion unit 13 then transmits the chroma information Cb1 (L1), chroma information Cr1(L1), luminance information Y3(L1) and luminance information Y4 (L1). The data conversion unit 13 then transmits the pixel data up to the pixel number 720 contained in the line number 480 to complete the transmission of pixel data representing a sole still image.

When line-sequentially (liner) transmitting still image data of the image type of 480_422_4×3, contained in the asynchronous packet 100, the data conversion unit 13 transmits, next to the address offset (address_offset), the luminance information Y1(L1), luminance information Y2(L1), luminance information Y3(L1), luminance information Y4 (L1), . . . up to the luminance information Y720(L1), for the line number 1, after which it transmits the chroma information Cb1(L1), Cr1(L1), . . . , chroma information Cb720(L1), Cr720(L1), for the line number 1, and then transmits the luminance information and the chroma information for the line number 2, and so on, until it transmits the chroma information Cr720 (L480) for the line number 480 to complete the transmission of the still image data, as shown in FIG. 16.

When line-sequentially (line) transmitting still image data of the image type of 480_420_4×3, contained in the asynchronous packet 100, the data conversion unit 13 first transmits the luminance information Y1(L1) up to luminance information Y720 (L1) of the line number 1, followed by the luminance information Y1(L2) up to luminance information Y720 (L2) of the line number 2, followed by the chroma information Cb1 (L1) and the chroma information Cr1 (L1) up to the chroma information Cb720 (L1) and the chroma information Cr719 (L1) to transmit the pixel data of the line numbers 1 and 2, after which the data conversion unit 13 transmits the luminance and chroma information for the line number 3 and so on until it transmits the chroma information Cb719 (L479) and the chroma information Cr719 (L479) to complete the transmission of the still image data, as shown in FIG. 17.

When doing printing setting, by designating the printing sheet type, printing sheet size, printing quality, printing color, position offset and layout, responsive to an operating input signal from the operation inputting unit 21, the data conversion unit 13 causes an operation mode 2, contained in the operation mode 2 command, shown in FIG. 18, different from the operation_mode_parameters, referred to below as operation mode 1 parameters, already proposed in the IEEE 1394 standard, to be stored in the capture command.

The operation mode 1 parameters are made up of the information for setting the size relation between the image and the printing sheet in three stages of large, medium and small (sizing), the information for setting the printing direction of the printing sheet (orientations), the information for setting the image printing positions (posx, posy), the information specifying how many of the same images are to be printed in a printing sheet (multiple_tiled), the information specifying how many images are to be printed in one page (number_of_pics), and the information how many copies are to be prepared (number_of_copies).

In the operation mode 2 command, the information specifying the operation mode 2 command, represented by "51" in hexadecimal, as the opcode (operation code), followed by the subfunction as operand [0], status as the operand [1], reserved as the operands [2] to operand [4], print_job_ID as the operand [5] to operand [16] and by operation_mode2_parameters (operation mode 2 parameters), specifying contents of the printing setting for the operation mode 2 command, as the operand [17] to operand [31], are stored.

In the subfunction, there is stored the information represented by 01 hexadecimal and which is termed "get", the information represented by 02 hexadecimal and which is termed "set" or the information represented by 03 hexadecimal and which is termed "query".

When acquiring the operation mode 2 parameters, indicating the printing setting information for the printing device 5, the data conversion unit 13 causes "get" to be stored in the subfunction. When setting the operation mode 2 parameters for the printing device 5, the data conversion unit 13 causes "set" to be stored, whereas, when desirous to know the possible range of setting of the operation mode 2 parameters of the printing device 5, the data conversion unit 13 causes "query" to be stored. Meanwhile, if the information is such information represented by other than 01, 02 or 03 hexadecimal, the subfunction is "Reserved".

When responding to the operation mode 2 command from the data conversion unit 13, a data input unit 31, which will be explained subsequently, generates an asynchronous packet in which the contents of the subfunction have been changed.

In the operation_mode 2_parameters, there are stored, the printing sheet type information (media_type), printing sheet size information (media_size), reserved area (reserved), printing quality information (print_quality), printing color information (mono_color), print offset information (offset) and layout setting information (layout_type), as shown in FIG. 20.

In the printing sheet type information (media_type), 1 bit is allocated to each setting item, with plural setting items being arrayed sequentially, as shown in FIGS. 21 and 22. That is, the device_dependent, Plain_paper (ordinary paper sheet), Bond_paper, (seal), special_paper (special paper), photo_paper (photo paper sheet) and transparency_film (OHP film), are arrayed sequentially. The type of the printing paper sheet is designated by the bits for the respective setting items being set by the data conversion unit 13 or the data input unit 31. As for the printing sheet type information, if the user fails to specify a printing paper sheet, but allows the printing device 5 to select an optimum printing paper sheet, a bit for the device_dependent is set.

As for the printing sheet size information (media_size), device_dependent, A5 (ISO and JIS A5), A4 (ISO and JIS A5), B5 (JIS B5), Executive (US. Executive), letter (US Letter), Legal (US Legal), Reserved, Hagaki (post-card), Oufuku_hagaki (reply post card), A6 (ISO and JIS A6 card), Index__4×6 (US index card 4"×6"), Index__5×3 (US index card 5"×3"), A3 (ISO A3), B4, Legal__1×17, Commercial 10_portrait (US Commercial #10 (portrait)), Commercial10_landscape (US Commercial #10 (landscape)), DL (International DL), C6 (International C6), A2 (US A2), Custom (custom paper), are stored, as shown in FIGS. 23 and 24. The printing sheet size information specifies the printing paper sheet size by the respective bits for each setting item being set by the data conversion unit 13 or the data input unit 31.

Referring to FIGS. 25 to 27, showing another example of the printing sheet size information (media_size), there are stored device_dependent and other, sequentially followed by standardized letter (North American letter size), legal (North American letter size), na__10×13 envelope (North American 10×13 envelope), na__9×12 envelope (North American 9×12 envelope), na_number__10_envelope (North American 10 business envelope), na__7×9 envelope (North American 7×9), na__9×11 envelope (North American 9×11), na__10×14 envelope (North American 10×14), na__6×9 envelope (North American 6×9 envelope), na__10×15 envelope (North American 10×15 envelope), a (engineering A), b (engineering B), c (engineering C), d (engineering D), iso a0 (ISO A0), iso a1 (ISO A1), iso a2 (ISO A2), iso a3 (ISO A3), iso a4 (ISO A4), iso a5 (ISO A5), iso a6 (ISO A6), iso a7 (ISO A7), iso a8 (ISO A8), iso a9 (ISO A9), iso a10 (ISO A5), iso b0 (ISO B0), iso b1 (ISO B1), iso b2 (ISO B2), iso b3 (ISO B3), iso b4 (ISO B4), iso b5 (ISO B5), iso b6 (ISO B6), iso b7 (ISO B7), iso b8 (ISO B8), iso b9 (ISO B9), iso b10 (ISO B10), iso c0 (ISO C0), c1 (ISO C1), iso c2 (ISO C2), c3 (ISO C3), c4 (ISO C4), c5 (ISO C5), iso c6 (ISO C6), c7 (ISO C7), c8 (ISO C8), iso designated (ISO Designated Long), jis b0 (JIS B0), jis b1 (JIS B1), jis b2 (JIS B2), jis b3 (JIS B3), jis b4 (JIS B4), jis b5 (JIS B5), jis b6 (JIS B6), jis b7 (JIS B7), jis b8 (JIS B8), jis b9 (JIS B9), jis b10 (JIS B10), index__4×6 (North American Index Card 4"×6"), index__5×8 (North American Index Card 5"×8"), japanese_hagaki (Japanese Hagaki Postcard), and japanese_ouhuku_hagaki (Japanese Ouhuku-Hagaki Postcard). The printing paper sheet size is designated by the bits for the respective setting items being set by the data conversion unit 13 or by the data input unit 31.

Figure 28:
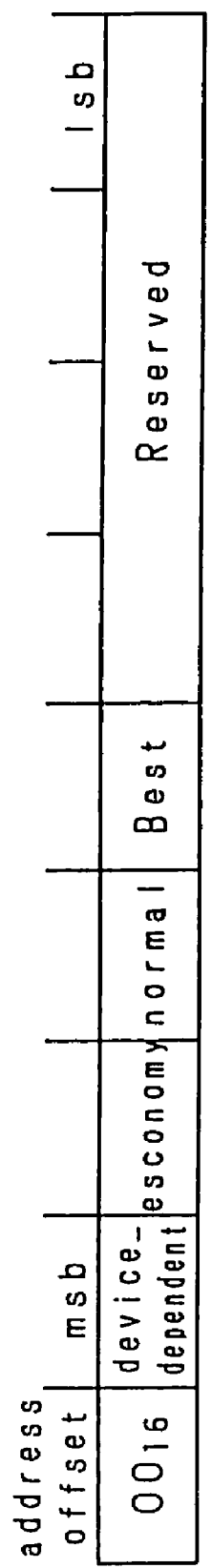
FIG. 28 illustrates the contents of the print_quality contained in the Operation_mode2_parameters.

As for the printing quality information (print_quality), the device_dependent, economy (with priority placed on speed), normal (normal) and best (with priority placed on picture quality), are stored, as shown in FIGS. 28 and 29. This printing quality information specifies the printing quality by the bits concerning the respective setting items being set by the data conversion unit 13 or by the data input unit 31.

Figure 30:
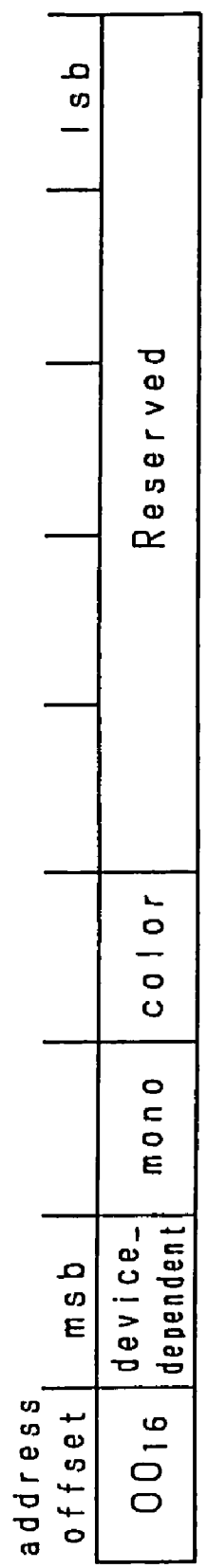
FIG. 30 illustrates an example of the contents of the mono_color contained in the operation_mode 2_parameters.

As the printing color information (mono_color), the device_dependent, mono (white/black printing) and color (color printing) are stored, as shown in FIGS. 30 and 31. This printing color information specifies the printing color by the bit for each setting item being set by the data conversion unit 13 or the data input unit 31.

Figure 32:
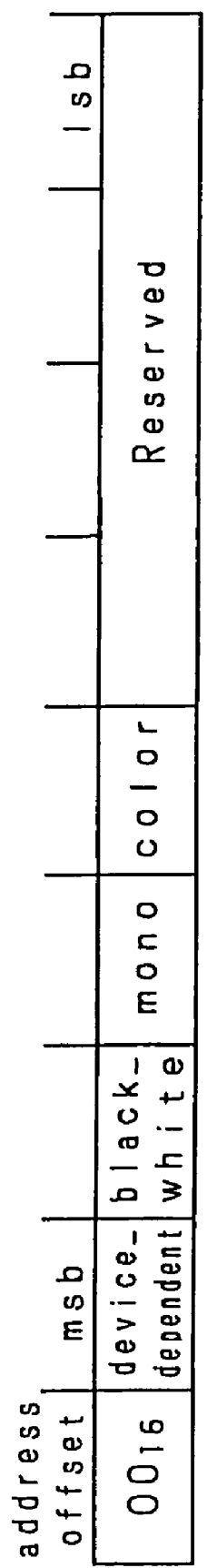
FIG. 32 illustrates another example of the contents of the mono_color contained in the operation_mode 2_parameters.

As another example of the printing color information (momo_color), the device_dependent, black_white (white-black printing), mono (momochromatic (gray scale) printing) and color (color printing) are stored, as shown in FIGS. 32 and 33.

As the printing offset position information (offset), offset_top and offset_left are stored, as shown in FIGS. 34 and 35. The offset_top and offset_left are expressed by X000 to X999 hexadecimal and specify an offset position with two bytes using the BCD (binary coded decimal). Meanwhile, X=0 hexadecimal and 8 hexadecimal denote the printing start position in an inner direction (plus direction) and that in an outer direction (minus direction) of the printing sheet, respectively. The lower two of the lower three bits represent an integer and the remaining bit denotes the value below a sub-binary point. In this manner, the upper left point of origin of the printing sheet is specified within a range of 0.00 mm to 99.9 mm from the top and left ends of the paper sheet, respectively, to specify the printing start position. The printing offset position information, represented by FFFF hexadecimal, is device_dependent. If the subfunction is qualy inquiring the possible setting range of the operation mode 2 parameters, the maximum setting value is stored in the printing offset position information.

Figure 36:
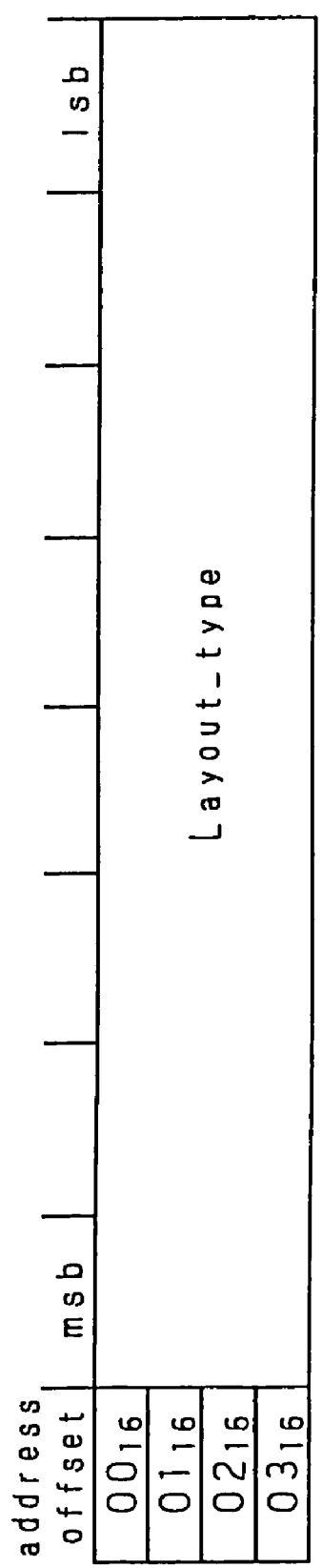
FIG. 36 illustrates the contents of the layout_type contained in operation_mode 2_parameters.

In the layout setting information (layout_type), 4-byte layout_type is stored in the layout setting information (layout_type), as shown in FIGS. 36 and 37. This layout setting information, represented by 00000000 to 0FFFFFFF hexadecimal, denotes the layout type. If represented by FFFFFFFF, the layout setting information denotes device_dependent.

Figure 18:
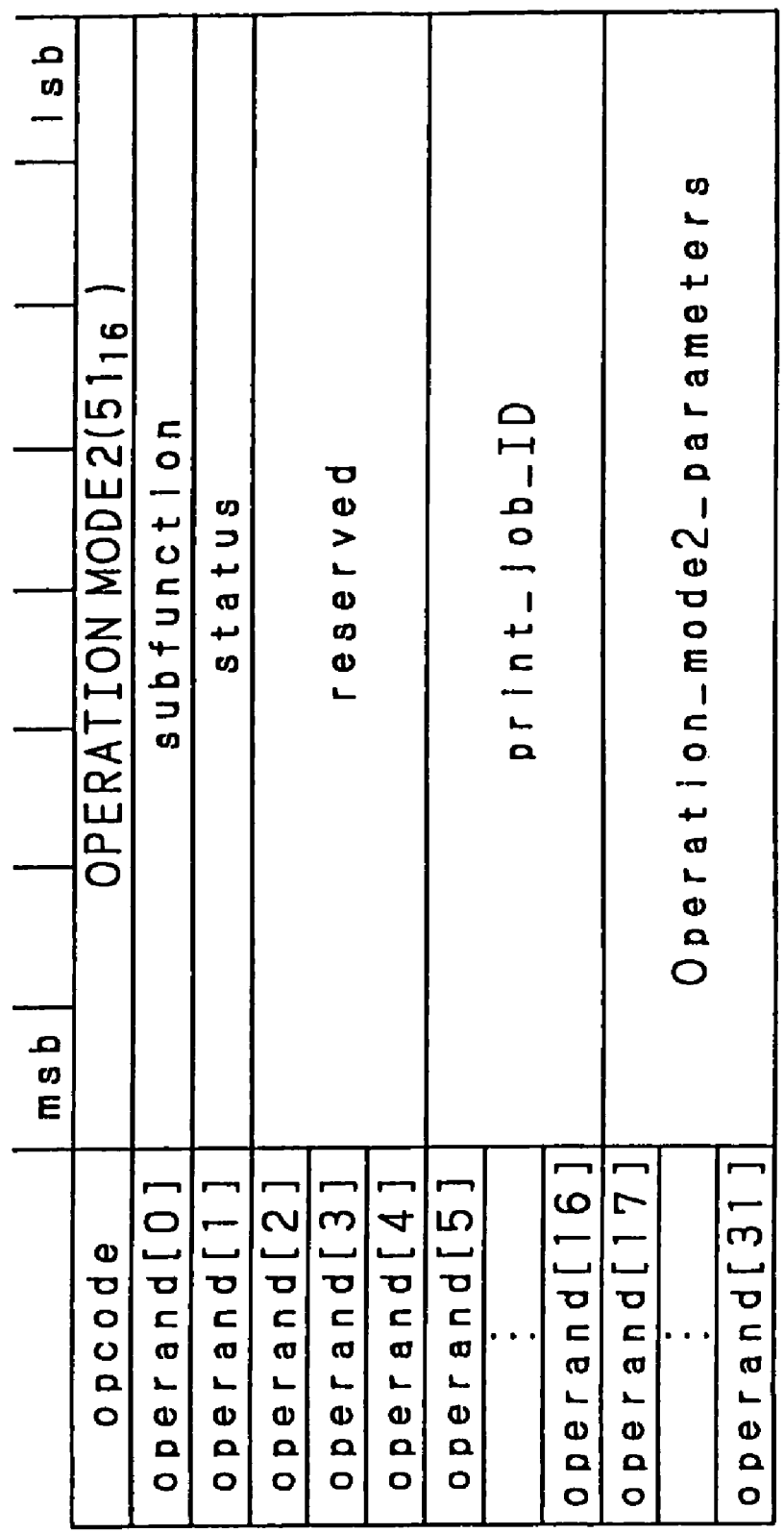
FIG. 18 illustrates a data structure of an asynchronous packet containing an operation mode 2 command.
Figure 38:
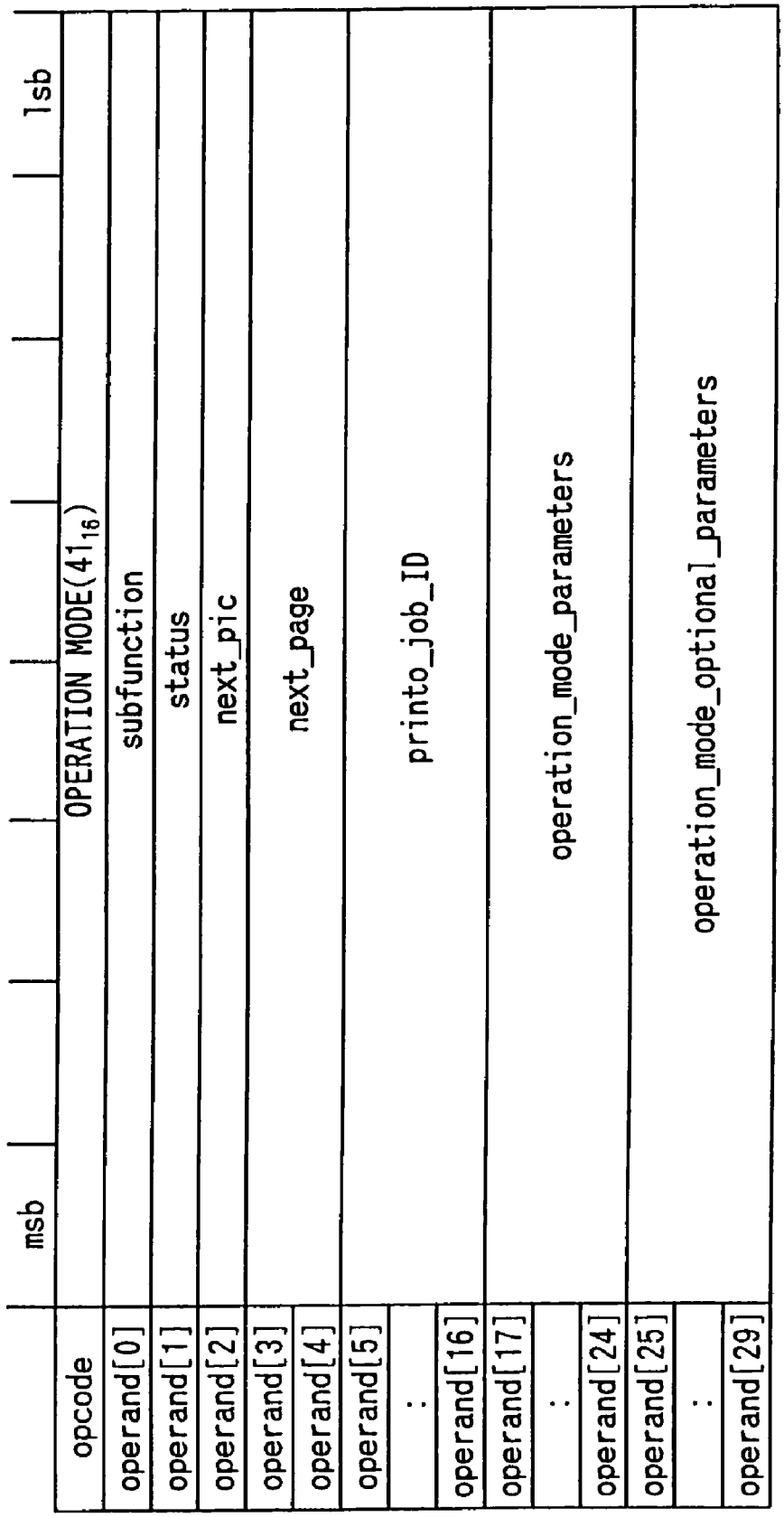
FIG. 38 illustrates another example of a command packet containing an operation mode command.

It is possible for the data conversion unit 13 to output the operation modes 1 and 2 as a sole command to the printing device 5, as another example of the command shown in FIG. 18, as shown in FIG. 38.

As for the operation command, the effect that the command is the operation command is represented by 41 hexadecimal, as shown in FIG. 38. Next to the subfunction, status, next_pic, next_page and to the print_job_ID, the operation_mode_parameters, corresponding to the operation mode 1 parameters, are stored in the operand [17] to operand [24], whereas the operation_mode_optional_parameters are stored in the operand [25] to the operand [29]. The operation_mode_optional_parameters, corresponding to the operation_mode 2_parameters contained in the operation mode 2 command in FIG. 18, denote the printing sheet type information, printing sheet size information, printing quality information, printing color information, printing offset position information and the layout setting information. In this operation command, the operation_mode_parameters represent the standard setting, whilst the operation_mode_optional_parameters are extension-set and processed between the data conversion unit 13 and the data input unit 31.

In the operation_mode_parameters, the information similar to the contents stored in the operation mode 1 command is stored.

In the operation_mode_optional_parameters, as in the operation_mode 2_parameters, shown in FIG. 20, stored in the operation mode 2_parameters shown in FIG. 18, there are stored the media_type, specifying the type of the printing sheet to be printed by the printing device 5, the media_size, denoting the size of the printing sheet printed in the printing device 5, the print_quality representing the quality of the printing in the printing device 5, mono_color, and the rendering intent, as shown in FIG. 39. Meanwhile, the processing employing the operation mode command, shown in FIGS. 38 and 39, will be explained subsequently.

The printing device 5 includes a data input unit 31, fed with the still image data from the printing device 5, a ROM (read-only memory) 32, having the printing control program, stored therein, a printing engine 33 for printing on a support, a RAM 34 and a CPU 35 controlling carious constituent portions, as shown in FIG. 2.

The data input unit 31 is made up of an interfacing circuit pursuant to e.g., the IEEE 1394 standard, and is responsive to the control signal from the CPU 35 to process still image data, contained in the asynchronous packet 100 from the STB 3, in accordance with the IEEE 1394 standard.

Specifically, the data input unit 31 performs processing on a transaction layer, link layer and on the physical layer, under serial bus control pursuant to the IEEE 1394 standard. So, the data input unit 31 outputs still image data contained in the asynchronous packet 100 to the CPU 35.

On reception of the command packet, having the operation mode 2 parameters stored therein, from the data conversion unit 13, the data input unit 31 outputs the various printing setting information to the CPU 35.

If the data input unit 31 has verified that "get" for acquiring the operation mode 2 parameters denoting the printing setting information of the printing device 5 is stored in the subfunction, the data input unit 31 recognizes the printing setting, desired to be acquired by the STB 3, from among the printing sheet type information, printing sheet size information, printing quality information, printing color information, printing offset position information and the layout setting information. The data input unit 31 returns a packet containing the operation mode 2 parameters pertinent to the recognized printing setting as a response to the data conversion unit 13.

If the data input unit 31 has verified that "set" for setting the operation mode 2 parameters of the printing device 5 is stored in the subfunction, the data input unit 31 recognizes the printing setting, desired to be acquired by the STB 3, from among the printing sheet type information, printing sheet size information, printing quality information, printing color information, printing offset position information and the layout setting information. The data input unit 31 outputs to the CPU 35 the information to the effect that the operation mode 2 parameters be set for the recognized printing setting.

If the data input unit 31 has verified that "qualy" inquiring the possible setting range of the operation mode 2 parameters is contained in the subfunction, the data input unit 31 checks the bits pertinent to the respective items among the printing sheet type information, printing sheet size information, printing quality information, printing color information, printing offset position information and the layout setting information, to recognize the printing setting inquired by the data conversion unit 13. The data input unit 31 returns a packet, corresponding to the asynchronous packet 100 in which has been included the possible setting value of the operation mode 2 parameters as to the printing setting inquire by the data conversion unit 13, as a response to the data conversion unit 13.

If a bit is set in the device_dependent in the printing sheet type information, printing sheet size information, printing quality information, printing color information, printing offset position information and the layout setting information, the data input unit 31 outputs that effect to the CPU 35.

If this data input unit 31 is mechanically connected to the STB 3 over e.g., an optical cable, the data input unit 31 performs connection setting with the data conversion unit 13 of the STB 3 for transmission/reception of the asynchronous packet 100 with the printing device 5.

The printing engine 33 is made up of a support holding and driving mechanism, a printer head and a printer head driving mechanism and is controlled by the CPU 35 to print a still image on the support.

The CPU 35 generates a control signal for controlling the printing engine 33. At this time, the CPU 35 operates in accordance with the printing control program stored in the ROM 32 and controls the contents of the RAM 34 then operating as a work area.

When fed with the printing sheet type information (media_type), printing sheet size information (media_size), printing quality information (print_quality), printing color information (mono_color), print offset information (offset) and layout setting information (layout_type) from the data input unit 31, the CPU 35 controls the printing engine 33 responsive to the various printing settings.

If the printing sheet type different from the printing sheet type specified by the printing sheet type information from the data input unit 31 is provided in the printing engine 33, the CPU 35 controls the data input unit 31 to generate a packet indicating that effect. If the printing setting differs from that for the operation mode 2 parameters, it is possible for the CPU 35 to demonstrate that effect on a display mechanism, such as a lamp, not shown.

If fed from the data input unit 31 with a signal indicating the setting of a bit in the device_dependent in the printing sheet type information, printing sheet size information, printing quality information, printing color information, printing offset position information and the layout setting information, the CPU 35 manages control to effect printing so that the printing sheet type, printing sheet size, printing quality, printing color, printing offset position and the layout setting will be optimum.

Figure 40:
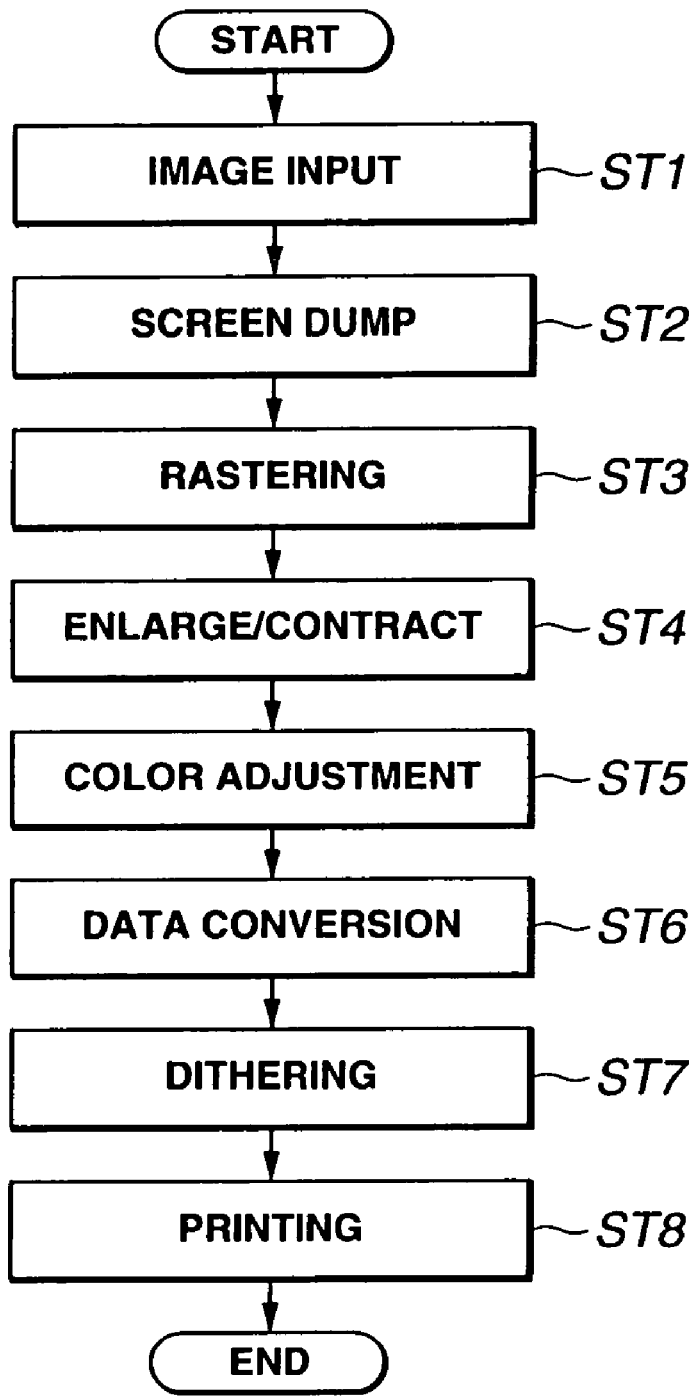
FIG. 40 is a flowchart for illustrating the processing sequence of the printing processing performed in a printing device of the image printing system embodying the present invention.

The CPU 35 performs processing shown by the flowchart of FIG. 40, in accordance with the printing control program.

First, at step ST1 in FIG. 40, the data input unit 31 of the printing device 5 receives a data packet generated pursuant to the IEEE 1394 standard from the data conversion unit 13. At this time, the data input unit 31 performs processing in the transaction layer, link layer and in the physical layer pursuant to the IEEE 1394 standard to extract still image data corresponding to the YCC image made up of the luminance information Y and the chroma information Cr, Cb. If the operation mode 2 parameters are contained in the command packet, the data input unit 31 outputs each printing setting to the CPU 35.

At the next step ST2, the CPU 35 performs screen dumping for printing the entire data displayed on the screen of the television device 4.

At the next step ST3, the CPU 35 performs rastering on the still image data screen-dumped at the above step ST2. That is, the CPU 35 converts the still image data into dot-type data for transferring the still image data to the printing engine 33.

At the next step ST4, the CPU 35 enlarges/contracts the still image data, rastered at the above step ST3, in accordance with e.g., the printing size information. That is, the CPU 35 manages control to vary the size of the still image being printed e.g., within a range specified by the user.

At the next step ST5, the CPU 35 adjusts the color of the still image data, enlarged/contracted at the above step ST4, in accordance with e.g., the printing color information, to change the still image data composed of the luminance information and the chroma information into monochromatic printing data.

The relation between the pixel values, specified in the color space by the Y (ITU-R BT. 601-4) format, and the pixel value, specified in the color space by RGB, is as follows:

$$Y'_{601YCC} = 0.299*R'_{RGB} + 0.587*G'_{RGB} + 0.144*B_{RGB}$$

$$Cr'_{601YCC} = 0.713*(R'_{RGB} - Y'_{601YCC}) = 0.500*R'_{RGB} - 0.419*G'_{RGB} - 0.081*B'_{RGB}$$

$$Cb'_{601YCC} = 0.564*(R'_{RGB} - Y'_{601YCC}) = -0.169*R'_{RGB} - 0.331*G'_{RGB} + 0.500*B'_{RGB}$$

In terms of an 8-bit value, the following relation holds:

$$Y'_{601YCC\_8\,bit} = (219.0*Y'_{601RGB}) + 16.0$$

$$Cr'_{601YCC\_8\,bit} = (224.0*Cb'_{601YCC}) + 128.0$$

$$Cb'_{601YCC\_8\,bit} = (2240.0*Cr'_{601YCC}) + 128.0.$$

This 8-bit value is returned as image data from the STB 3 to the printing device 5. At this step ST5, the 8-bit YCC value is converted into RGB.

The relation between the pixel values, specified in the color space by the Y (ITU-R BT. 709-2) format, and the pixel value, specified in the color space by RGB, is as follows:

$$Y'_{709YCC} = 0.2126*R'_{RGB} + 0.7152*G'_{RGB} + 0.0722*B'_{RGB}$$

$$Cr'_{7091YCC} = 0.5389*(B'_{RGB} - Y'_{709YCC})$$

$$Cb'_{709YCC} = 0.6350*(R'_{RGB} - Y_{709YCC})$$

In terms of an 8-bit value, the following relation holds:

$$Y'_{709YCC\_8\,bit} = (219.0*Y_{709RGB}) + 16.0$$

$$Cr'_{709YCC\_8\,bit} = (224.0*Cb'_{709YCC}) + 128.0$$

$$Cb'_{709YCC\_8\,bit} = (224.0*Cr'_{709YCC}) + 128.0.$$

This 8-bit value is returned as image data from the STB 3 to the printing device 5. At this step ST5, the 8-bit YCC value is converted into RGB.

At the next step ST6, the CPU 35 effects color adjustment and performs processing of converting RGB printing data to cyan, magenta and yellow, to determine the ratio of the cyan, magenta and yellow in each dot. At the next step ST7, the CPU 35 performs dithering.

At step ST8, the CPU 35 outputs the printing data, obtained on dithering, to the printing engine 33 to drive the printing engine 33 to print an image on a support. At this time, the CPU 35 sets the printing sheet type, printing sheet size, printing quality, printing color, printing offset position and the layout setting, in accordance with the operation mode 2 parameters, to effect printing.

In the above-described image printing system 1, the processing performed by the CPU 23 in printing the image data received by the STB 3 by the printing device 5 is explained with reference to FIG. 41.

Figure 41:
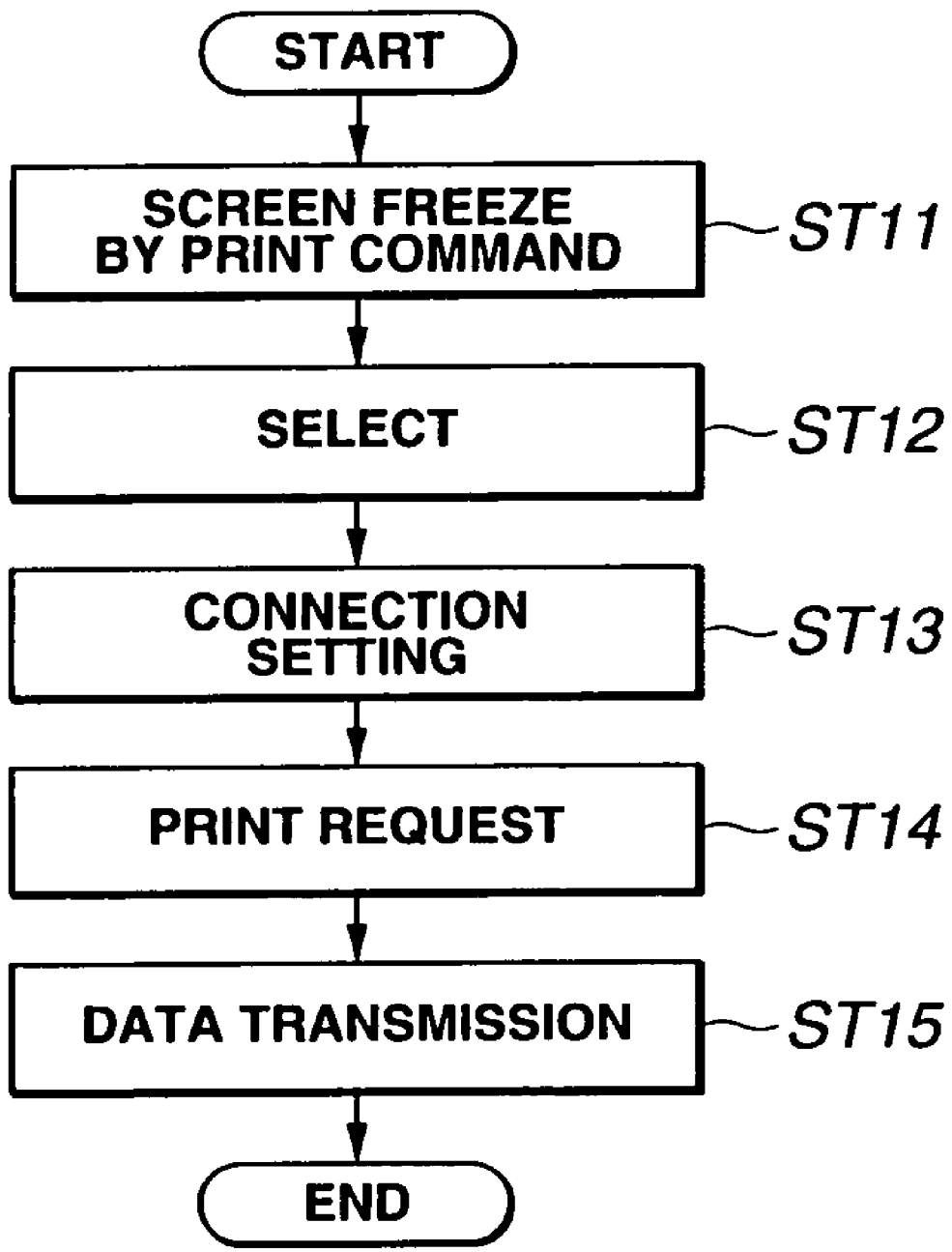
FIG. 41 is a flowchart for illustrating the processing sequence of the CPU of the STB in printing an image displayed on a television receiver device by a printing device.

In the flowchart shown in FIG. 41, the CPU 23 is fed at step ST11 with an operating input signal to the effect that the moving picture displayed on the television device 4 be frozen, by the user acting on an operating button provided on the STB 3. The CPU 23 is responsive thereto to control the display controller 19 to halt the outputting of the moving picture data from the NTSC processor 18 to the television device 4 to display a still image on the television device 4.

If, at the next step ST 12, the operating input signal for selecting the frame-based still image data, demonstrated on the television device 4 and frozen by the operation at step ST11, and for printing the displayed image data on the printing device 5, is sent to the CPU 35, the CPU 35 controls the display controller 19, MPEG processor 16 and the demultiplexer 14 to read the frame-based still image data stored in the display memory 20 into the image memory 15. This causes the CPU 23 to store the still image data, composed of the luminance information Y and the chroma information Cr, Cb, in the image memory 15.

At the next step ST13, the CPU 35 controls the data conversion unit 13 so that connection setting will be made between the STB 3 and the printing device 5 in accordance with the IEEE 1394 standard. That is, if fed with the control signal for connection setting from the CPU 23, the data conversion unit 13 generates a command packet to recognize the plug with the data input unit 31. At this time, the data conversion unit 13 send the command packet, in which the information indicating the transmitting side plug is stored by the data input unit 31 of the printing device 5. The data input unit 31 of the printing device 5 recognizes the information, representing the reception side plug, and transmits to the data conversion unit 13 a command packet which has stored the information indicating the reception side plug. Thus, the data conversion unit 13 recognizes the information indicating the reception side plug of the data input unit 31 of the printing device 5. The data input unit 31 recognizes the information representing the transmitting side plug of the data conversion unit 13 of the STB 3.

At the next step ST 14, the CPU 23 generates a command packet, specifying the printing sheet type, printing sheet size, printing quality, printing color, printing offset position and the layout setting in printing the still image by the printing device 5, in accordance with the operating input signal, to output the generated command packet to the data input unit 31, while generating a command packet containing the capture command to output the generated command packet by way of issuing a printing request.

At the next step ST 15, the CPU 23 controls the demultiplexer 14 and the data conversion unit 13 to output still image data to be printed by the printing device 5, to the printing device 5, to generate a data packet containing still image data stored in the image memory 15 to transmit the generated packet to the printing device 5.

If the printing device 5 receives plural data packets, containing the destination plug denoting information, to verify that the still image data in their entirety has been received, the printing device 5 causes the CPU 35 to perform the processing shown in FIG. 40, to effect the printing of the image represented by the still image data in accordance with the designated printing size.

An example of the operation of transmitting/receiving the asynchronous packet 100 between the STB 3 and the printing device 5 to print the still image data by the printing device 5 is now explained with reference to FIG. 42.

Figure 42:
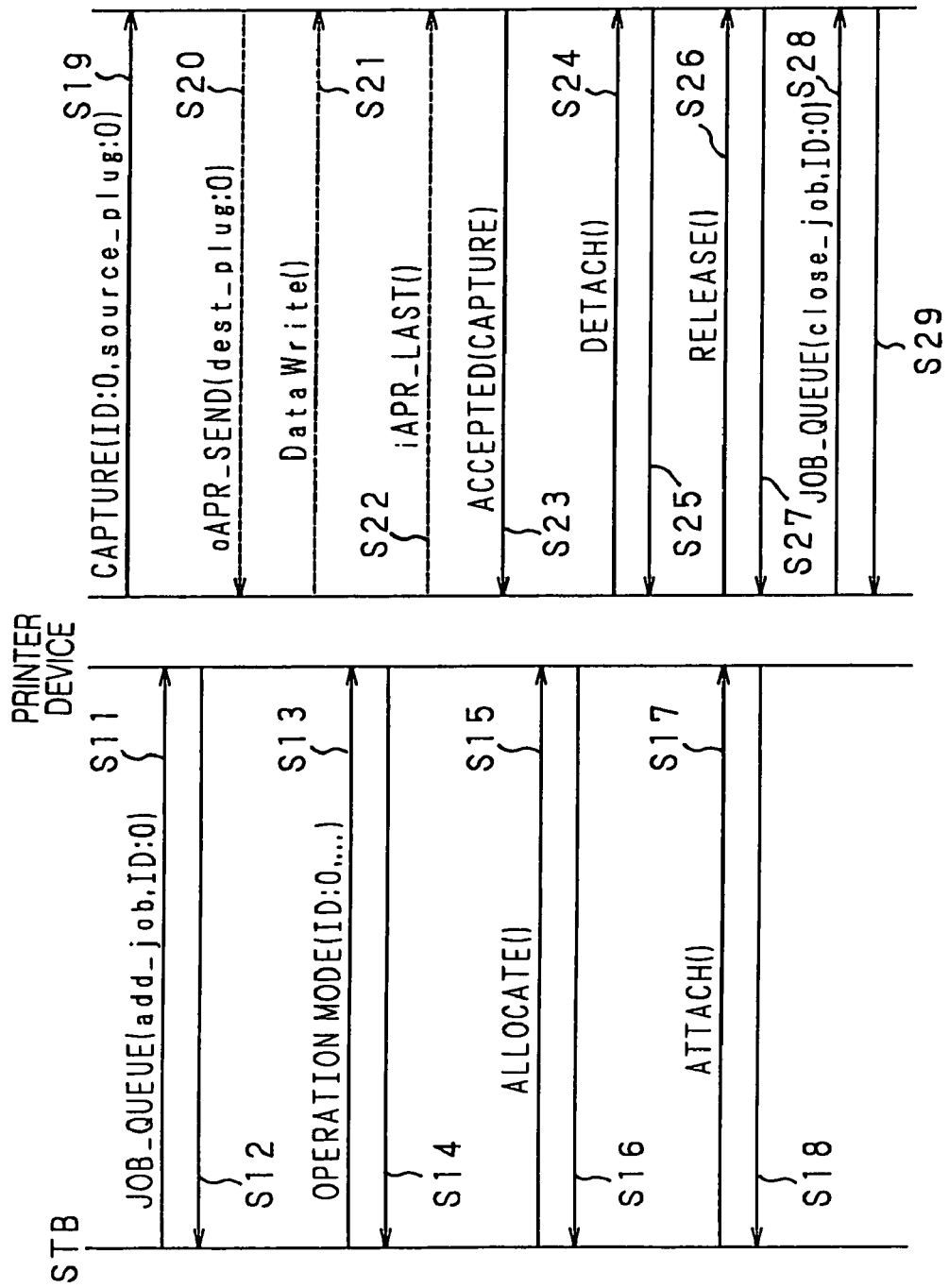
FIG. 42 illustrates the processing for printing still image data by transmitting/receiving an asynchronous packet between the STB and the printing device.

In FIG. 42, the data conversion unit 13 prior to starting the printing transmits to the printing device 5 a command packet (JOB_QUEUE) to indicate that there is a job of printing a still image, and acquires a corresponding response packet S12.

On the other hand, the data conversion unit 13 transmits to the printing device 5 a command packet S13 specifying the operation mode indicating the type or size of the printing sheet for printing by the printing device 5, printing quality, color for printing (monochromatic/color) or the printing position, or the operation mode 2 parameters inclusive of the information pertinent to the printing sheet type, printing sheet size, printing quality, printing color, printing offset position and the layout setting, to acquire the corresponding response packet S14. At this time, the data conversion unit 13 verifies whether or not the printing device 5 is able to accept the operation mode 2 parameters.

The data conversion unit 13 sets a plug for transmitting the still image data to the data input unit 31. That is, the data conversion unit 13 sends the command packet S15, having the ALLOCATE command stored therein, to the data input unit 31, instructing the data input unit 31 to set a reception plug, to acquire a corresponding response packet S16.

The data conversion unit 13 also sends a command packet S17, having stored therein an ATTACH command, for setting a plug for receiving a data packet containing the still image data to be printed by the printing device 5 to effect data packet transmission/reception, and acquires a corresponding response packet S18.

The data conversion unit 13 then transmits a command packet S19 containing a capture command. In the command packet S19 is stored the information (source_plug) indicating the transmission side plug on the side data conversion unit 13, whereby the data input unit 31 recognizes the transmission side plug of the data conversion unit 13.

The data input unit 31 then transmits to the data conversion unit 13 a packet S20 including the information for setting an OAPR (output asynchronous port register). In the packet S20 is stored the information representing the destination plug of the data input unit 31 (dest_plug). At this time, the data input unit 31 on reception of the command packet S19, transmits the information specifying the recognized transmission side plug by a packet S20. The data conversion unit 13 recognizes the destination plug of the data input unit 31.

The data conversion unit 13 transmits to the data input unit 31 a data packet S21 having stored in the data portion 102 the YCC image as the still image data. The data conversion unit 13 splits the still image data into pre-set data volumes to transmit the resulting plural data packets S21.

The data conversion unit 13 transmits to the data input unit 31 a response packet S22 containing the information pertinent to the iAPR (input Asynchronous Port Register) of the flow control register of the transmission side plug.

The data conversion unit 13 transmits to the data conversion unit 13 a command packet S23 indicating acceptance of the capture command.

The data conversion unit 13 is responsive thereto to transmit a command packet S24 containing a DETACH command indicating the disconnection from the printing device 5 to acquire a response packet S25 from the data input unit 31.

The data conversion unit 13 then transmits a command packet S25, containing a RELEASE command, to the data input unit 31 of the printing device 5, to acquire a corresponding response packet S26 from the data input unit 31.

The data conversion unit 13 then sends to the data input unit 31 a command packet (JOB_QUEUE) S28, indicating completion of the sequence indicating the job for printing a still image, and acquires a corresponding response packet S29.

Next, the operation of transmitting/receiving a command packet containing an operation mode command shown in FIGS. 38 and 39, by the data conversion unit 13, between the STB 3 and the printing device 5, is explained. It is noted that, in the STB 3 and the printing device 5, the operation_mode_parameters corresponding to the operation mode 1 parameters represent the standard setting, whilst the operation_mode_parameters corresponding to the operation mode 2 parameters represent the extension setting.

First, a case in which the STB 3 and the printing device 5 are adapted for coping only with the standard setting, that is an example of establishing a setting corresponding only to the operation_mode_parameters to transmit/receive an asynchronous packet designating image data and various settings from the data conversion unit 13 to the data input unit 31, is explained.

When the STB 3 sets the operation_mode_parameters, as a standard setting of the operation mode, in the printing device 5, the a command packet containing a control command (CONTROL command), with the subfunction being set, from the data conversion unit 13 to the data input unit 31, as shown in FIG. 43. At this time, the data conversion unit 13 sets a flag pertinent to each parameter (e.g., plain-paper) of each setting item (e.g., media_type) specified by the user, in the operation_mode_parameters, to store a setting request (requested state) to store 0 in hexadecimal in an operand of the operation_mode optional_parameters.

If the data input unit 31 is able to accept a control command, and if the data input unit 31 is to transmit to the data conversion unit 13 a response packet to the effect that the control packet is to be accepted, it transmits a response packet containing an accept response (ACCEPT response). The data input unit 31 modifies the next_pic and the next_page, contained in the command packet transmitted from the data conversion unit 13 and, responsive to the state of the printing device 5, sets a flag to generate a response packet, if the respective parameters requested by the data conversion unit 13 can be set in the operation_mode_parameters. Since the respective parameters requested by the control command can be accepted in their entirety in the printing device 5, the state of the printing device 5 (current state) coincides with the parameter (requested state) required by the STB 3. The status in the response packet, which is 00 hexadecimal, indicates the no-error state.

If the control command is unacceptable, and the respective parameters requested by the data conversion unit 13 can be set, a flag is set in each parameter contained in the operation_mode_parameters. As for the setting item for which setting is not possible, a response packet containing a reject response (REJECT response) stating F in hexadecimal in the corresponding operand, is generated and transmitted to the data conversion unit 13. For example, if the setting item media_size contained in the operation_mode_parameters cannot be set, FF in hexadecimal is stated in an operand corresponding to the media_size. In the status contained in the response packet, there are stored a value indicating the rejected state and the reason as to the rejected setting item.

If the STB 3 acquires the operation_mode_parameters, as a standard setting of the operation mode, from the printing device 5, a command packet containing a status command (STATUS command), with the subfunction being set to "get", is transmitted from the data conversion unit 13 to the data input unit 31. At this time, the data conversion unit 13 stores F in hexadecimal in an operand of the operation_mode_parameters to advise the printing device 5 of the fact that the setting acquired by the STB 3 is the standard setting. The data conversion unit 13 then stores 0 in hexadecimal in an operand of the operation_mode_optional_parameters.

If the data input unit 31 is able to accept a status command, and is to transmit to the data conversion unit 13 a response packet for accepting a status command, the data input unit 31 transmits a response packet containing a stable response (STABLE response). The data input unit 31 modifies the next_pic and the next_page, contained in the command packet transmitted from the data conversion unit 13 and, responsive to the state of the printing device 5, generates a response packet containing a stable response having stored in the operation_mode_parameters the values (current values) corresponding to the respective parameters requested to be acquired by the data conversion unit 13. If the status in the response packet is 00 hexadecimal, it indicates a no-error state.

If the status command cannot be accepted, a response packet containing a reject response (REJECT response) stating the status of the printing device 5 corresponding to the respective parameters contained in the operation_mode_parameters is generated and transmitted to the data conversion unit 13. In the status contained in the response packet, there are stored a value indicating the rejected state and the reason as to the rejected setting item.

Next, a case in which the STB 3 is adapted for coping only with the standard setting and the printing device 5 is adapted for coping with the standard setting and the extension setting, is now explained.

If the operation_mode_parameters, as a standard setting for the operation mode, is to be set on the side STB 3, a command packet containing a control command (CONTROL command), with the subfunction being set to "set", is transmitted from the data conversion unit 13 to the data input unit 31, as shown in FIG. 45. At this time, the data conversion unit 13 stores a setting request (requested state), in which a flag is set for each parameter, such as Plain-paper, in each setting item, such as media_type, as specified by the user, in the operation_mode_parameters, to store 0 in hexadecimal in an operand of the operation_mode optional_parameters.

If the data input unit 31 is able to accept a control command, and is to transmit to the data conversion unit 13 a response packet for accepting the control command, the data input unit 31 transmits a response packet containing an accept response (ACCEPT response). The data input unit 31 modifies the next_pic and the next_page, contained in the command packet transmitted from the data conversion unit 13, responsive to the state of the printing device 5, and sets a 1 bit to generate a response packet, if each parameter requested by the data conversion unit 13 can be set in the operation_mode_parameters. Since the respective parameters in the printing device 5, as requested by the control command, are acceptable in their entirety, the state of the printing device 5 (current state) coincides with the parameter requested by the STB 3 (requested state). The data input unit 31 also sets the operation_mode_optional_parameters to vender_dependent to generate a response packet indicating that printing is possible by extended setting to transmit the so-generated response packet to the data conversion unit 13. If the status in the response packet is 00 hexadecimal, it indicates a no-error state.

If the control command cannot be accepted, a flag is set in each parameter contained in the operation_mode_parameters. If no parameter can be set, a response packet containing a reject response (REJECT response) stating F in hexadecimal in an operand corresponding to each setting item is generated and returned to the data conversion unit 13. The data input unit 31 also sets the operation_mode_optional_parameters to vender_dependent to generate a response packet indicating that printing is possible by extended setting to transmit the so-generated response packet to the data conversion unit 13. In the status contained in the response packet, there are stored a value indicating the rejected state and the reason as to the rejected setting item.

If the STB 3 is to acquire the operation_mode_parameters as a standard setting of the operation mode, a command packet containing a status command (STATUS command), in which the subfunction is set to "get", is transmitted from the data conversion unit 13 to the data input unit 31, as shown in FIG. 46. At this time, the data conversion unit 13 causes F in hexadecimal to be stored in an operand of the operation_mode_parameters, to advise the printing device 5 of the fact that the setting acquired by the STB 3 is the standard setting. The data conversion unit 13 also causes 0 in hexadecimal to be stored in an operand of the operation_mode optional_parameters.

If the data input unit 31 is able to accept a status command, and is to transmit to the data conversion unit 13 a response packet to the effect that the status command will be accepted, the data input unit 31 transmits a response packet containing a stable response (STABLE response). The data input unit 31 modifies the next_pic and the next_page, contained in the command packet transmitted from the data conversion unit 13 and, responsive to the state of the printing device 5, stores the value (current value) corresponding to each parameter requested to be acquired by the data conversion unit 13. The data input unit 31 also generates a response packet containing a stable response having stored in the operation_mode_optional_parameters the values (current values) corresponding to the respective parameters. The status in the response packet is set to 00 hexadecimal to indicate a no-error state.

If the status command cannot be accepted, a response packet containing a reject response (REJECT response), in which the values in meeting with respective parameters requested to be acquired by the data conversion unit 13 (current values) are stored in the operation_mode_parameters, depending on the state of the printing device 5, and values in meeting with respective parameters (current values) are stored in the operation_mode_optional_parameters, is generated and transmitted to the data conversion unit 13. In the status contained in the response packet, there are stored a value indicating the rejected state and the reason as to the rejected setting item.

Next, a case in which the STB 3 is adapted for coping with the standard setting and extension setting and the printing device 5 is adapted for coping only with the standard setting is now explained.

If the operation_mode_parameters and the operation_mode_optional_parameters, as a standard setting and an extension setting for the operation mode, is to be set on the side STB 3, a command packet containing a control command (CONTROL command), with the subfunction being set to "set", is transmitted from the data conversion unit 13 to the data input unit 31, as shown in FIG. 47. At this time, the data conversion unit 13 stores a setting request (requested state), in which a flag pertinent to each parameter, such as Plain-paper, in each setting item, such as media_type, as specified by the user, in the operation_mode_parameters and in the operation_mode_optional_parameters. Since the printing device 5 is adapted for coping only with the standard setting, the data input unit 31 generates a response packet, indicating the extension setting being not possible (NOT. IMPLEMENTED). The data input unit 31 modifies the next_pic and the next_page, contained in the command packet transmitted from the data conversion unit 13 and, responsive to the state of the printing device 5, sets a 1 bit to generate a response packet, having stored 0 in hexadecimal in the operation_mode optional_parameters, if each parameter requested by the data conversion unit 13 can be set in the operation_mode_optional_parameters.

If the side STB 3 is to acquire the operation_mode_parameters, as a standard setting for the operation mode, a command packet containing a status command (STATUS command), in which the subfunction is set to "get", is transmitted from the data conversion unit 13 to the data input unit 31, as shown in FIG. 48. At this time, the data conversion unit 13 stores F in hexadecimal in the operands of the operation_mode_parameters and in the operation_mode_optional_parameters to advise the side printing device 5 of the fact that the setting to be acquired by the side STB 3 is the standard setting. Since the printing device 5 is adapted for coping only with the standard setting, the data input unit 31 generates a response packet, indicating the extension setting being not possible (NOT IMPLEMENTED). The data input unit 31 modifies the next_pic and the next_page, contained in the command packet transmitted from the data conversion unit 13, depending on the transmitted command packet, to store values consistent with respective parameters requested to be acquired by the data conversion unit 13 (current values) in the operation_mode_parameters, depending on the state of the printing device 5, to generate a response packet, having 0 in hexadecimal stored in the operation_mode_optional_parameters.

Next, a case in which the STB 3 and the printing device 5 are adapted for coping with the standard setting an the extension setting, is now explained.

When the side STB 3 is to set the operation_mode_parameters and the operation_mode_optional_parameters, as the standard and extension settings for the operation mode, a command packet containing a control command (CONTROL command), with the subfunction being set to "set", is transmitted from the data conversion unit 13 to the data input unit 31, as shown in FIG. 49. At this time, the data conversion unit 13 stores a setting request (requested setting), in which a flag for each parameter of each setting item is specified by the user, in the operation_mode_parameters and in the operation_ mode_optional_parameters.

If the data input unit 31 is able to accept the control command, and is to transmit to the data conversion unit 13 a response packet stating the effect that the data input unit 31 is ready to accept the control command, the data input unit 31 transmits a response packet containing an accept response (ACCEPT response). The data input unit 31 modifies the next_pic and the next_page, contained in the command packet transmitted from the data conversion unit 13, responsive to the state of the printing device 5, and sets a bit 1 if each parameter requested from the data conversion unit 13 can be set, in the operation_mode_parameters and in the operation_mode_optional_parameters, depending on the state of the printing device 5, to generate a response packet. Since the respective parameters requested by the control command can be accepted in their entirety in the printing device 5, the state of the printing device 5 (current state) coincides with the parameter (requested state) required by the STB 3. The data input unit 31 also sets the operation_mode_optional_parameters to vendor_dependent to generate a response packet indicating that the printing is possible in the extension setting to transmit the generated response packet to the data conversion unit 13. The status in the response packet, which is 00 hexadecimal, indicates the no-error state.

If the control command cannot be accepted, a flag is set in each parameter contained in the operation_mode_parameters and in the operation_mode optional_parameters. If no parameter can be set, a response packet containing a reject response (REJECT response) stating F in hexadecimal in an operand corresponding to each setting item is generated and transmitted to the data conversion unit 13. The data input unit 31 also sets the operation_mode_parameters and the operation_mode_optional_parameters to vender_dependent to generate a response packet indicating that printing is possible by extended setting to transmit the so-generated response packet to the data conversion unit 13. In the status contained in the response packet, there are stored values indicating the rejected state and the reason as to the rejected setting item.

If the STB 3 is to acquire the operation_mode_parameters and the operation_mode optional_parameters, as a standard setting and an extension setting of the operation mode, a command packet containing a status command (STATUS command), in which the subfunction is set to "get", is transmitted from the data conversion unit 13 to the data input unit 31, as shown in FIG. 50. At this time, the data conversion unit 13 causes F in hexadecimal to be stored in the operands of the operation_mode_parameters and the operation_mode_optional_parameters to advise the printing device 5 of the fact that the setting acquired by the STB 3 is the standard setting.

If the data input unit 31 is able to accept a status command, and is to transmit to the data conversion unit 13 a response packet to the effect that the status command will be accepted, the data input unit 31 transmits a response packet containing a stable response (STABLE response). The data input unit 31 modifies the next_pic and the next_page, contained in the command packet transmitted from the data conversion unit 13 and, responsive to the state of the printing device 5, stores the values (current values) corresponding to the respective parameters requested to be acquired by the data conversion unit 13, while generating a response packet containing a stable response having stored in the operation_mode_parameters and in the operation_mode_optional_parameters the values (current values) corresponding to the respective parameters required to be acquired by the data conversion unit 13. The status in the response packet is set to 00 hexadecimal to indicate a no-error state.

If the status command cannot be accepted, a response packet, in which the values (current values) in meeting with respective parameters requested to be acquired by the data conversion unit 13 are stored in the operation_mode_parameters and in the operation_mode_optional_parameters, depending on the state of the printing device 5, is generated and transmitted to the data conversion unit 13. In the status contained in the response packet, there are stored values indicating the rejected state and the reason as to the rejected setting item.

So, with the present image printing system 1, the printing sheet type information, printing sheet size information, printing quality information, printing color information, printing offset position information and the layout setting information may be included in the asynchronous packet 100, even if the STB 3 and the printing device 5 are interconnected pursuant to the IEEE 1394 standard, to effect detailed printing setting in meeting with the requests by the user.

That is, with the present image printing system 1, it is possible for the user to generate an operating input signal requesting a printing quality or a printing speed to cause the printing device 5 to perform printing processing in meeting with the operating input signal.

Moreover, if, in the present image printing system 1, the printing paper sheet is a seal having an incision, or is such a printing sheet in which printing at a correct printing position is not possible unless the printing position is specified precisely, the printing device 5 is able to perform correct printing by transmitting a command packet containing the printing paper sheet information or the printing offset position information from the data conversion unit 13 to the data input unit 31.

Moreover, it is possible with the present image printing system 1 to specify an upper left point of origin of the printing sheet within a range of 0.00 mm to 99.9 nm from the top and left ends of the paper sheet by the offset position information to provide for fine control of the printing start position.

Although the printing position within the effective printing area is specified by e.g., the layout setting information, there are occasions wherein the effective printing area is offset delicately depending on the difference in the paper feed system, such as manual paper feed system or a paper feed system employing a paper cassette. If the mechanical precision in paper feed is changed in this manner depending, for example, on the user-dependent using state of the printing device 5, chronological changes of the printing device 5, thicknesses, surface states or size of the printing paper sheets, the printing start position can be set finely by the printing offset position information to provide for printing at the correct printing positions.

With this image printing system 1, it is possible for the STB 3 to effect optimum printing depending on the paper sheet type. Specifically, with the present image printing system 1, the printing speed can be adjusted, depending on the sort of the printing paper sheet, such as by setting the printing speed to a lower value when using a seal as the printing paper sheet than when using an ordinary paper sheet.

Moreover, with the present image printing system 1, if the printing device 5 is set to a condition different from that requested by the user, that effect can be presented to the user by the CPU 35 of the printing device 5 managing control for sending a command packet indicating such effect from the data input unit 31 to the data conversion unit 13.

In the above explanation of the image printing system 1, non-compressed still image data is included in the asynchronous packet 100 and transmitted to the printing device 5. It is however possible for the MPEG processor 16 to effect compression processing in accordance with the JPEG system to transmit/receive the still image data included in the asynchronous packet 100. Since the transmitted data volume can be decreased in this manner, it is possible to realize data transfer and printing processing at a higher speed.

In the foregoing explanation of the image printing system 1, the STB 3 and the printing device 5 are provided with the data conversion unit 13 and the data input unit 31, as interfacing circuits in meeting with the IEEE 1394 standard. However, any other suitable interfacing circuits, such as USBs, may also be employed. Specifically, with the image printing system 1 provided with the STB 3 having the USB and the printing device 5, it is possible to transmit/receive packets between the STB 3 and the printing device 5 by the digital system to print a fine image by the printing device 5.

What is claimed is:

1. An image processing apparatus comprising:
   image processing means for generating desired still image data corresponding to input image data;
   printing control information generating means for generating printing control information for controlling a printing device; and
   outputting means for having the still image data generated by said image processing means included in a packet pursuant to the IEEE (The Institute of Electrical and Electronic Engineers) 1394 standard for outputting to a printing device, said outputting means defining the printing control information generated by said printing control information generating means by an AV/C command set consistent with an FCP (function control protocol) pursuant to the IEEE 1394 standard for outputting to said printing device;
   said outputting means outputting, over an IEEE 1394 bus, said printing control information and subsequently outputting said still image data to said printing device; and
   means for printing still image data,
   wherein said printing control information is generated for said still image data and contains one or more of printing sheet type information, printing sheet size information, printing color information, printing quality information, or the printing layout information,
   wherein said printing control information adjusts printing speed based on said printing sheet type information, and
   wherein said packet is outputted at regular intervals and said packet includes a capture command which indicates that said still image data is being transmitted.

2. An image processing method comprising:
   generating desired still image data corresponding to input image data;
   generating the printing control information for controlling a printing device;
   defining the generated printing control information by an AV/C command set conforming to an FCP (function control protocol) pursuant to the IEEE (The Institute of Electrical and Electronic Engineers) 1394 standard for outputting to said printing device; and
   outputting, over an IEEE 1394 bus, the defined printing control information and the generated still image data included in a packet pursuant to the IEEE 1394 standard to said printing device,
   wherein said printing control information is generated for said still image data and contains one or more of the printing sheet type information, printing sheet size information, printing color information, printing quality information, or the printing layout information, and
   adjusting printing speed based on said printing sheet type information,
   wherein said packet is outputted at regular intervals and said packet includes a capture command which indicates that said still image data is being transmitted.

3. A printing device comprising:
   input means for inputting, from an IEEE (The Institute of Electrical and Electronic Engineers) 1394 bus, still image data included in a packet pursuant to the IEEE 1394 standard and the printing control information defined in an AV/C command set consistent with an FCP (function control protocol) pursuant to the IEEE 1394 standard; and
   printing means for printing the still image data inputted to said input means;
   said still image data being inputted to said input means after inputting said printing control information thereto;
   said printing means printing said still image data in accordance with said printing control information,
   wherein said printing control information is generated for said still image data and contains one or more of the printing sheet type information, printing sheet size information, printing color information, printing quality information, or the printing layout information,
   wherein said printing control information adjusts printing speed based on said printing sheet type information, and
   wherein said packet is inputted at regular intervals and said packet includes a capture command which indicates that said still image data is being transmitted.

4. A printing method comprising:
   inputting, from an IEEE (The Institute of Electrical and Electronic Engineers) 1394 bus, the printing control information defined in an AV/C command set consistent with an FCP (function control protocol) pursuant to the IEEE 1394 standard;
   inputting still image data included in a packet pursuant to the IEEE 1394 standard; and
   printing said still image data in accordance with the input printing control information,
   wherein said printing control information is generated for said still image data and contains one or more of the printing sheet type information, printing sheet size information, printing color information, printing quality information, or the printing layout information, wherein said printing control information adjusts printing speed based on said printing sheet type information, and wherein said packet is inputted at regular intervals and said packet includes a capture command which indicates that said still image data is being transmitted.

5. An image printing system comprising:

an image processing device;

said image processing device including image processing means for generating desired still image data corresponding to input image data;

printing control information generating means for generating the printing control information for controlling a printing device; and outputting means for having the still image data generated by said image processing means included in a packet pursuant to the IEEE (The Institute of Electrical and Electronic Engineers) 1394 standard for outputting to a printing device, said outputting means defining the printing control information generated by said printing control information generating means by an AV/C command set consistent with an FCP (function control protocol) pursuant to the IEEE 1394 standard for outputting to said printing device;

said outputting means outputting, over an IEEE 1394 bus, said printing control information and subsequently outputting said still image data to said printing device;

input means for inputting said still image data and the printing control information from said image processing device; and printing means for printing the still image data inputted to said input means in accordance with said printing control information, wherein said printing control information is generated for said still image data and contains one or more of the printing sheet type information, printing sheet size information, printing color information, printing quality information, or the printing layout information, wherein said printing control information adjusts printing speed based on said printing sheet type information, and wherein said packet is outputted at regular intervals and said packet includes a capture command which indicates that said still image data is being transmitted.

6. A computer readable recording medium having stored therein a printing program, said printing program comprising the steps of:

inputting, from an IEEE (The Institute of Electrical and Electronic Engineers) 1394 bus, the printing control information defined in an AV/C command set consistent with an FCP (function control protocol) pursuant to the IEEE 1394 standard;

inputting still image data included in a packet pursuant to the IEEE1394 standard; and printing said still image data in accordance with the input printing control information, wherein said printing control information is generated for said still image data and contains one or more of the printing sheet type information, printing sheet size information, printing color information, printing quality information, or the printing layout information, wherein said printing control information adjusts printing speed based on said printing sheet type information, and wherein said packet is inputted at regular intervals and said packet includes a capture command which indicates that said still image data is being transmitted.

\* \* \* \* \*